United States Patent
Masuda

(10) Patent No.: US 11,054,692 B2
(45) Date of Patent: Jul. 6, 2021

(54) DISPLAY DEVICE

(71) Applicant: SHARP KABUSHIKI KAISHA, Sakai (JP)

(72) Inventor: Junichi Masuda, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 244 days.

(21) Appl. No.: 16/305,862

(22) PCT Filed: May 23, 2017

(86) PCT No.: PCT/JP2017/019162
§ 371 (c)(1),
(2) Date: Nov. 29, 2018

(87) PCT Pub. No.: WO2017/208897
PCT Pub. Date: Dec. 7, 2017

(65) Prior Publication Data
US 2019/0129246 A1    May 2, 2019

(30) Foreign Application Priority Data

May 30, 2016  (JP) .............................. JP2016-107691

(51) Int. Cl.
G02F 1/1335    (2006.01)
G02F 1/133     (2006.01)
G02F 1/1347    (2006.01)
F21V 8/00      (2006.01)
G02B 27/01     (2006.01)
G09G 3/34      (2006.01)
G09G 3/36      (2006.01)

(52) U.S. Cl.
CPC ..... G02F 1/133536 (2013.01); G02B 6/0023 (2013.01); G02B 6/0041 (2013.01);
(Continued)

(58) Field of Classification Search
None
See application file for complete search history.

(56) References Cited

U.S. PATENT DOCUMENTS

| 5,537,233 A | 7/1996 | Miura et al. |
| 2005/0041179 A1 | 2/2005 | Suzuki |

(Continued)

FOREIGN PATENT DOCUMENTS

| JP | H07-146473 A | 6/1995 |
| JP | 2004-199027 A | 7/2004 |

(Continued)

*Primary Examiner* — Edward J Glick
*Assistant Examiner* — Anthony G Quash
(74) *Attorney, Agent, or Firm* — ScienBiziP, P.C.

(57) ABSTRACT

A display device includes a display that displays an image based on an image signal and that also functions as a see-through display. The display includes a light source, a light guide plate, a first polarization modulating element disposed at a display surface side of the light guide plate, an absorptive polarization plate disposed on a surface of the first polarization modulating element at a display surface side, a second polarization modulating element disposed at a back surface side of the light guide plate, the second polarization modulating element controlling a polarization state of an incident polarization wave in accordance with on/off of the light source, and a reflective polarization plate disposed on a surface of the second polarization modulating element at a back surface side.

15 Claims, 30 Drawing Sheets

(52) U.S. Cl.
CPC ......... *G02B 6/0056* (2013.01); *G02B 6/0066* (2013.01); *G02F 1/133* (2013.01); *G02F 1/1335* (2013.01); *G02F 1/1347* (2013.01); *G02F 1/13471* (2013.01); *G02B 6/009* (2013.01); *G02B 6/0088* (2013.01); *G02F 1/133562* (2021.01); *G02F 1/133567* (2021.01); *G02F 2203/66* (2013.01); *G09G 3/3406* (2013.01); *G09G 3/36* (2013.01)

(56) References Cited

U.S. PATENT DOCUMENTS

| | | | | |
|---|---|---|---|---|
| 2006/0187380 A1* | 8/2006 | Tsuda | ................... | G02B 6/0056 349/96 |
| 2006/0209002 A1* | 9/2006 | Uchikawa | ............. | G02F 1/1336 345/102 |
| 2010/0177025 A1 | 7/2010 | Nagata et al. | | |
| 2013/0016307 A1 | 1/2013 | Jeong et al. | | |
| 2016/0187724 A1* | 6/2016 | Masuda | ............ | G02F 1/133536 349/65 |

FOREIGN PATENT DOCUMENTS

| | | | | |
|---|---|---|---|---|
| JP | 2006-162680 A | 6/2006 | | |
| JP | 2013-020256 A | 1/2013 | | |
| JP | 2015-125260 A | 7/2015 | | |
| JP | 2015125260 A * | 7/2015 | ................ | F21S 2/00 |
| WO | 2005/008322 A1 | 1/2005 | | |
| WO | 2009/122716 A1 | 10/2009 | | |
| WO | WO-2015053023 A1 * | 4/2015 | ....... | G02F 1/133536 |
| WO | 2015/095288 A2 | 6/2015 | | |

* cited by examiner

FIG. 7
(A)
BACKGROUND
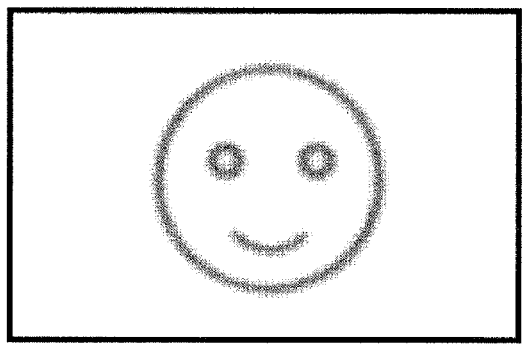
BRIGHTNESS OF SCREEN
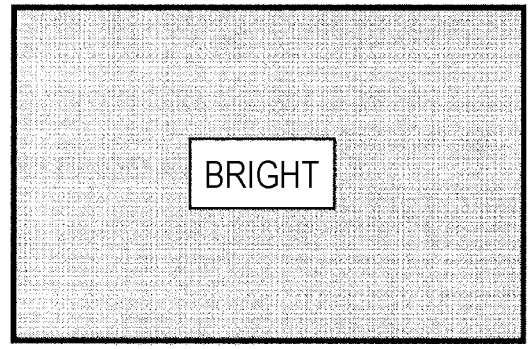
(B)
BACKGROUND
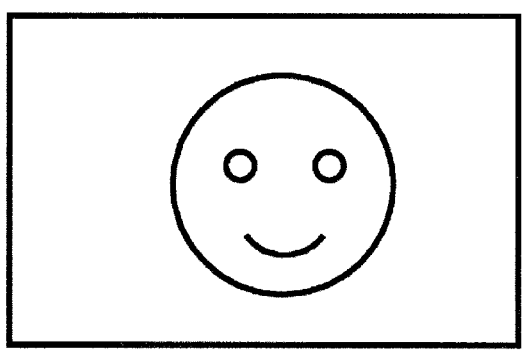
BRIGHTNESS OF SCREEN
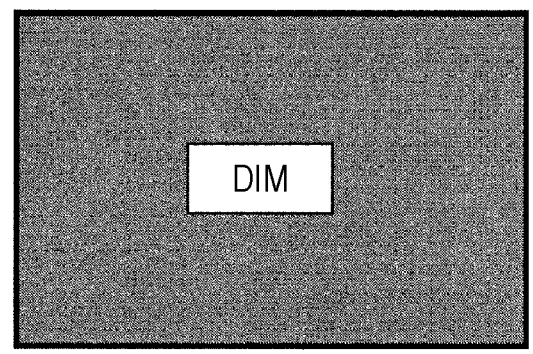

FIG. 16

| | FRONT SURFACE SIDE | BACK SURFACE SIDE | ADVANTAGEOUS EFFECTS OF PRESENT EMBODIMENT |
|---|---|---|---|
| FIRST BASE STUDY | 0.25 | 0.50 | |
| SECOND BASE STUDY | $0.25+\alpha$ ($\alpha \leq 0.25$) | $0.25+\alpha$ ($\alpha \leq 0.25$) | ADVANTAGEOUS EFFECTS WHEN COMPARED TO FIRST BASE STUDY<br>· LIGHT UTILIZATION EFFICIENCY IMPROVES BY 2 TIMES<br>· QUANTITY OF LIGHT TRANSMITTED TO BACK SURFACE SIDE IS 0 |
| FIRST EMBODIMENT | 0.5 | 0 | ADVANTAGEOUS EFFECTS WHEN COMPARED TO SECOND BASE STUDY<br>· LIGHT UTILIZATION EFFICIENCY IMPROVES<br>· BACKGROUND BLUR IS SUPPRESSED |

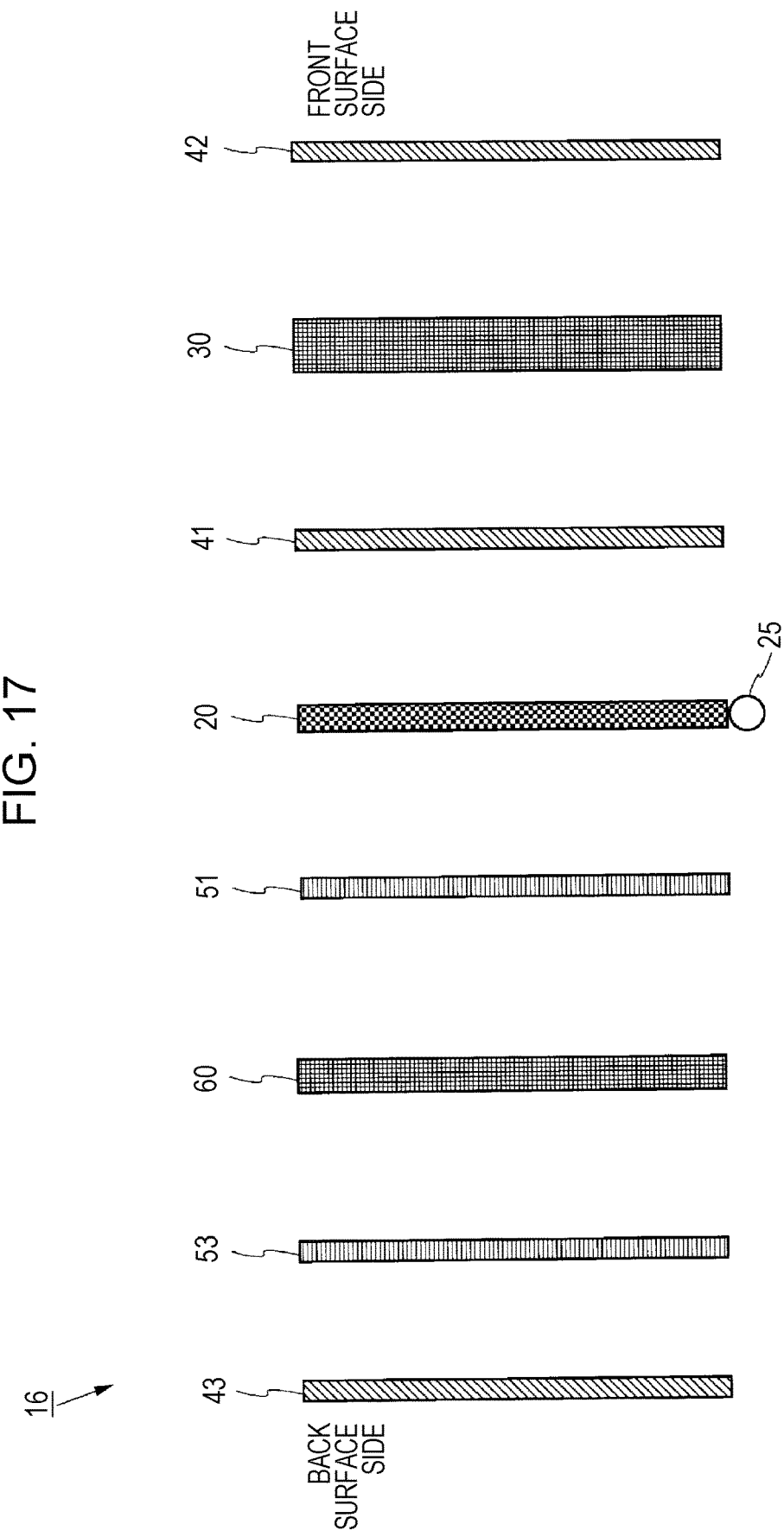

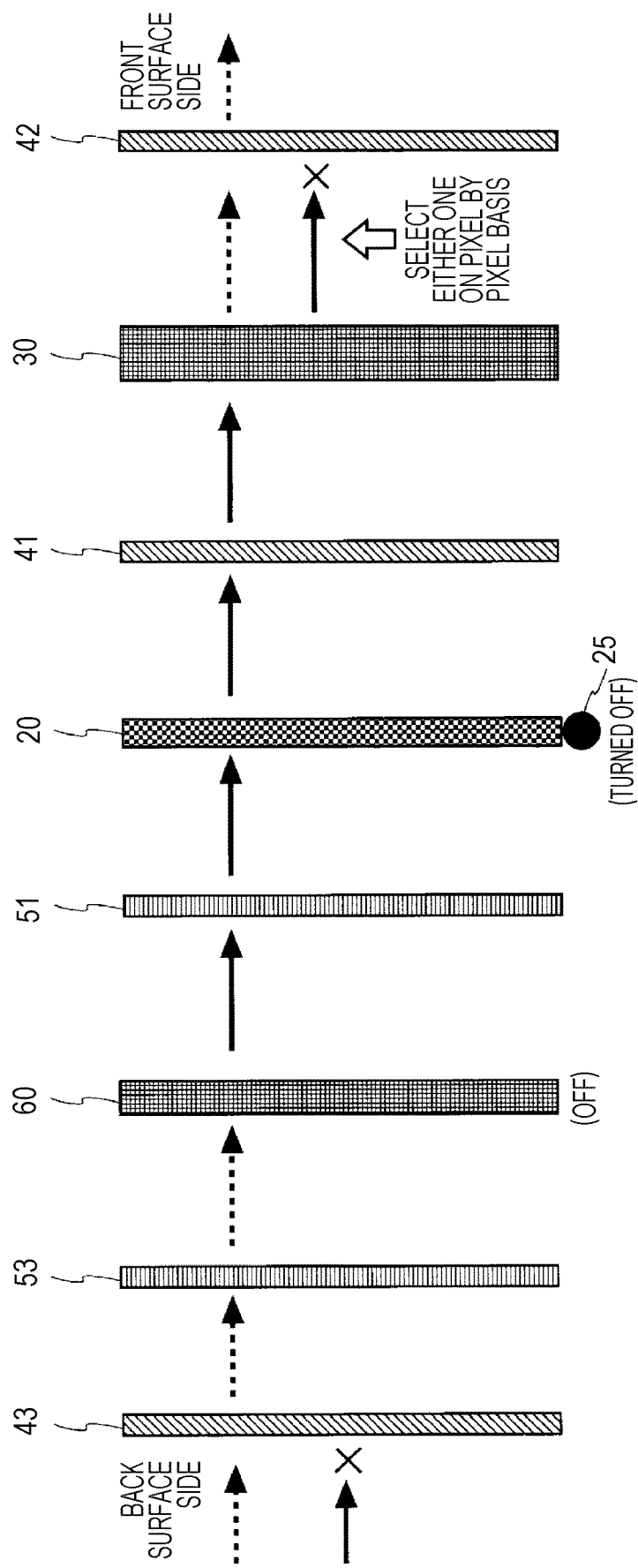

FIG. 25

| | FRONT SURFACE SIDE | BACK SURFACE SIDE | ADVANTAGEOUS EFFECTS OF PRESENT EMBODIMENT |
|---|---|---|---|
| FIRST BASE STUDY | 0.25 | 0.5 | |
| SECOND BASE STUDY | $0.25+\alpha$ ($\alpha \leq 0.25$) | $0.25+\alpha$ ($\alpha \leq 0.25$) | ADVANTAGEOUS EFFECTS WHEN COMPARED TO FIRST BASE STUDY<br>· LIGHT UTILIZATION EFFICIENCY IMPROVES BY 2 TIMES OR MORE |
| THIRD EMBODIMENT | $0.5+\alpha$ ($\alpha \leq 0.5$) | 0 | ADVANTAGEOUS EFFECTS WHEN COMPARED TO SECOND BASE STUDY<br>· LIGHT UTILIZATION EFFICIENCY IMPROVES BY APPROXIMATELY 2 TIMES |

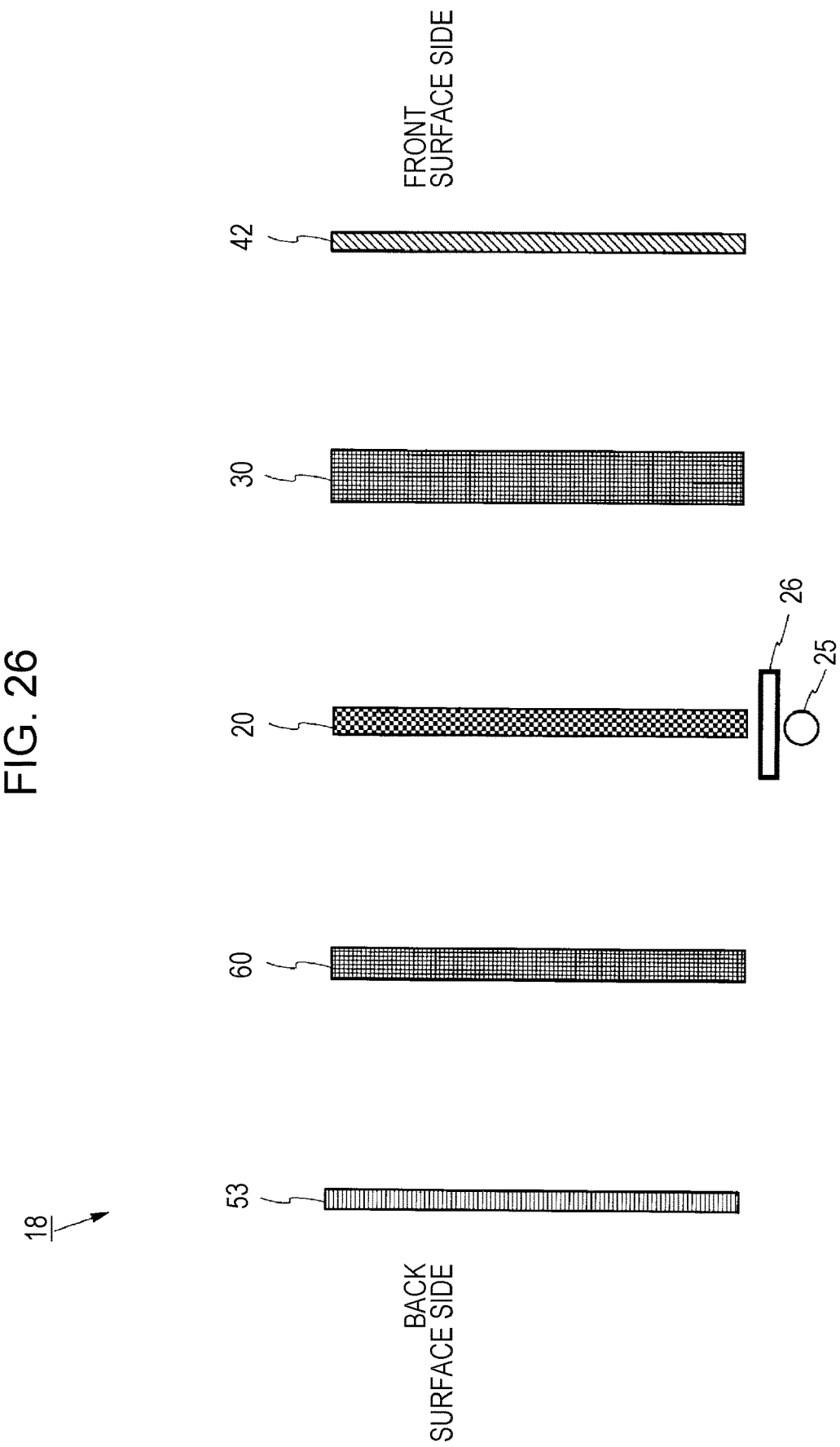

DISPLAY DEVICE

TECHNICAL FIELD

The present invention relates to display devices and, in particular, relates to a display device that functions as a see-through display as well which allows a background to be seen therethrough.

BACKGROUND ART

In recent years, actively being developed are display devices that not only display images based on externally supplied image signals but also function as displays which allow a back surface side to be seen therethrough from a front surface side (hereinafter, referred to as "see-through displays" in some cases). Various systems are employed in such see-through displays, including a system in which a liquid-crystal panel is used, a system in which a transparent organic EL (Organic Light-Emitting Diode) and an ITO (Indium Tin Oxide) thin film, which is a transparent metal, are combined, and a projector system.

The liquid-crystal display device module described in PTL 1 is a see-through display in which reflection and transmission characteristics of a cholesteric liquid crystal are used. This liquid-crystal display device module displays an image by making light incident directly from a backlight unit disposed on a side surface of a liquid-crystal panel; thus, the visibility of the image is improved, and the transparency of the liquid-crystal panel obtained when the liquid-crystal display device module is used as a see-through display is improved.

In the display device described in PTL 2, a backlight unit is disposed between two liquid-crystal cells to irradiate the liquid-crystal cells with backlight, and reflective polarization plates are affixed to the two respective sides of the backlight unit. Thus, the display device can display a bright image on the two liquid-crystal cells. In addition, since the two liquid-crystal panels are irradiated simultaneously by a single backlight unit, the number of the backlight units can be reduced, and the power consumption can be reduced.

CITATION LIST

Patent Literature

PTL 1: Japanese Unexamined Patent Application Publication No. 2013-20256
PTL 2: Japanese Unexamined Patent Application Publication No. 2004-199027

SUMMARY OF INVENTION

Technical Problem

However, in a see-through display of a system in which a liquid-crystal panel is used, for example, an optical member with high transparency needs to be disposed within the display device in order to make the back surface side more easily visible. Disposing such an optical member leads to an increase in the light transmitted to the back surface side, which thus leads to a decrease in the light, of the light emitted from a light guide plate, that is transmitted to the front surface side. Therefore, the utilization efficiency of the light emitted from the light guide plate decreases. Although it depends on the method of extracting light from the light guide plate, the light emitted from the rear surface of the display device toward the rear surface side often has a peak in a specific angular direction relative to the light guide plate. Therefore, when a viewer present at the back surface side sees the rear surface of the display device in the specific angular direction, the viewer's eyes are hit by the brightest light, and the viewer is more likely to experience stress.

In the liquid-crystal display device module described in PTL 1, an equal quantity of light is emitted to the front surface side and the back surface side of the liquid-crystal panel, and the light emitted to the back surface side cannot be reused. Therefore, the utilization efficiency of the light incident on the liquid-crystal panel from the backlight unit decreases. In the display device described in PTL 2, the reflective polarization plates on the two sides of the light guide plate are affixed such that their reflection axes are orthogonal to each other. Therefore, this display device cannot be used as a see-through display that allows the back surface side to be seen therethrough from the front surface side.

Accordingly, the present invention is directed to providing a display device that can increase the quantity of light transmitted to a front surface side by improving the utilization efficiency of backlight and that can reduce stress to be experienced by a viewer by suppressing glare on a back surface side.

Solution to Problem

A first aspect provides a display device including a display that displays an image based on an image signal and that also functions as a see-through display.

The display includes a light source that emits light including at least one of a first polarization wave and a second polarization wave, the second polarization wave having a polarization axis orthogonal to a polarization axis of the first polarization wave, a light guide plate that emits the light emitted from the light source toward a display surface side and a rear surface side of the display, a first polarization modulating element disposed at a display surface side of the light guide plate, the first polarization modulating element having a plurality of pixels formed therein.

an absorptive polarization plate disposed on a surface of the first polarization modulating element at a display surface side, a second polarization modulating element disposed at a back surface side of the light guide plate, the second polarization modulating element controlling a polarization state of as incident polarization wave in accordance with on/off of the light source, and a reflective polarization plate disposed on a surface of the second polarization modulating element at a back surface side, wherein the first polarization modulating element controls a signal voltage corresponding to the image signal applied to each of the pixels to control the polarization state of the polarization wave transmitted through the pixels, and wherein the second polarization modulating element emits the polarization wave upon converting the polarization state thereof while the light source is being turned off and transmits the polarization wave without converting the polarization state thereof while the light source is being turned on.

In a second aspect, in the first aspect,
the second polarization modulating element is constituted by a single pixel.

In a third aspect, in the first aspect,
the second polarization modulating element is constituted by a plurality of pixels and emits the polarization wave upon converting the polarization state thereof in each of the pixels or emits the polarization wave without converting the polarization state thereof.

In a fourth aspect, in the first aspect,
a reflective polarization plate is disposed at least between the light guide plate and the second polarization modulating element.

In a fifth aspect, in the fourth aspect,
an absorptive polarization plate is disposed between the first polarization modulating element and the light guide plate.

In a sixth aspect, in the fifth aspect,
an absorptive polarization plate is disposed on a rear surface of the display.

In a seventh aspect, in the fourth aspect,
a reflective polarization plate is disposed between the first polarization modulating element and the light guide plate, and the light guide plate includes a polarization scattering element.

In an eighth aspect, in the first aspect,
the polarization wave emitted from the light guide plate toward a display surface side and a rear surface side of the display is either the first polarization wave or the second polarization wave.

In a ninth aspect, in the eighth aspect,
a polarization element that transmits one of the first polarization wave and the second polarization wave is disposed between the light source and the light guide plate.

In a tenth aspect, in the eighth aspect,
laser light emitted by the light source is either the first polarization wave or the second polarization wave.

In an eleventh aspect, in the first aspect,
the first polarization modulating element and the second polarization modulating element are liquid-crystal panels.

In a twelfth aspect, in the eleventh aspect,
the first polarization modulating element and the second polarization modulating element are normally white liquid-crystal panels.

In a thirteenth aspect, in the eleventh aspect,
the liquid-crystal panels are panels of a twisted nematic system.

In a fourteenth aspect, in the first aspect,
a color filter is further disposed between the first polarization modulating element and the absorptive polarization plate.

In a fifteenth aspect, in the first aspect,
the light source includes a plurality of types of light-emitting bodies that emit light that can express at least white and causes the plurality of light-emitting bodies to emit light successively in time division.

Advantageous Effects of Invention

According to the first aspect, not only the polarization wave emitted from the light guide plate toward the display surface side but also the polarization wave emitted to the rear surface side can be transmitted to the front surface side. Thus, the display device displays an image or functions as a see-through display that allows a background to be seen through the display. In this manner, the utilization efficiency of the light emitted from the light guide plate can be improved, and the screen can thus be made brighter. In addition, the polarization wave emitted from the light guide plate to the rear surface side is reflected to the display surface side, and the quantity of light transmitted to the back surface side of the display can be brought to "0." Thus, a viewer present at the back surface side of the display does not experience stress associated with glare. Furthermore, when the state of the front surface side is seen through the see-through display, if the brightness of the front surface side is insufficient, the rear surface of the display enters a mirror state and can also reflect the state of the back surface side.

According to the second aspect, since the second polarization modulating element is constituted by a single pixel, the second polarization modulating element can be controlled with ease.

According to the third aspect, since the second polarization modulating element is constituted by a plurality of pixels and can emit the polarization wave upon converting the polarization state thereof in each pixel or emit the polarization wave without converting the polarization state thereof. Thus, the polarization state of an incident polarization wave can be controlled finely.

According to the fourth aspect, as the reflective polarization plate is disposed between the light guide plate and the second polarization modulating element, one of the first and second polarization waves emitted from the light guide plate to the rear surface side is reflected toward the display surface side. This prevents the reflected polarization wave from being transmitted to the back surface side, and thus any glare experienced by a viewer present at the back surface side of the display can be reduced. Therefore, the viewer does not experience stress associated withe glare.

According to the fifth aspect, as the absorptive polarization plate is disposed between the light guide plate and the first polarization modulating element, one of the first and second polarization waves from the light guide plate to the display surface side is absorbed. Thus, when seeing the display from the front surface side, a viewer can see a luminous state at positions corresponding to off-state pixels and see a screen in which black display appears at positions corresponding to on-state pixels.

According to the sixth aspect, one of the first and second polarization waves incident from the back surface side is transmitted through the absorptive polarization plate disposed on the rear surface of the display, and the other one of the first and second polarization waves is absorbed by the absorptive polarization plate. Therefore, when a viewer present at the back surface side sees the front surface side, even if the brightness of the front surface side is low, the rear surface of the display does not enter a mirror state, and thus an object placed at the front surface side can be seen with ease. In addition, since the rear surface of the display does not enter a mirror state, the display can be used to keep any object placed at the back surface side from being displayed on the rear surface of the display.

According to the seventh aspect, as the reflective polarization plate is disposed between the light guide plate and the first polarization modulating element, one of the first and second polarization waves emitted from the light guide plate is transmitted through the reflective polarization plate to exit to the front surface side. However, the other one of the first and second polarization waves is reflected repeatedly between the two reflective polarization plates disposed with the light guide plate interposed therebetween. In this case, as the other polarization wave passes through the polarization scattering element included in the light guide plate at each instance of reflection, a polarization wave that is the same as the one polarization wave is generated, and the generated polarization wave is transmitted to the front surface side. Accordingly, the utilization efficiency of the light emitted from the light guide plate improves; thus, the quantity of light transmitted to the display surface side further increases, and the screen can be made even brighter.

According to the eighth aspect, the light emitted from the light guide plate is either the first polarization wave or the second polarization wave, which thus renders two polarization plates sandwiching the light guide late unnecessary. Accordingly, the number of components constituting the display can be reduced, and thus the cost of manufacturing the display can be reduced.

According to the ninth aspect, the polarization element is inexpensive, and the polarization element can be easily installed between the light guide plate and the light source; thus, the cost of manufacturing the display device can be reduced.

According to the tenth aspect, the use of a laser as the light source renders the polarization element unnecessary. Thus, the number of components constituting the display can be reduced.

According to the eleventh aspect, since the polarization modulating elements are liquid-crystal panels, the polarization state of the incident light can be controlled with ease.

According to the twelfth aspect, since the polarization modulating elements are normally white liquid-crystal panels, the display functions as a see-through display while the power sources of the liquid-crystal panels are in an off state, and a viewer can see the state of the back surface side or the state of the front surface side. Thus, the power consumed when the display is functioning as a see-through display can be reduced.

According to the thirteenth aspect, since the liquid-crystal panels, serving as the polarization modulating elements, are of a twisted nematic system, a conversion between the first polarization wave and the second polarization wave can be carried out with ease.

According to the fourteenth aspect, as the color filter is provided between the polarization modulating element and the second polarization plate, the light transmitted from the back surface side or the light emitted from the light guide plate to the front surface side is transmitted through the color filter. Thus, a viewer present at the front surface side can see a color image or see toe state of the back surface side in color.

According to the fifteenth aspect, by irradiating the polarization modulating element successively in time division with the in colors that can express at least white, a viewer present at the front surface side can see a color image or see the state of the back surface side in color. Furthermore, since no color filter needs to be provided, absorption of the light by a color filter does not occur, and the image or the state of the back surface side can be displayed with a higher luminance.

BRIEF DESCRIPTION OF DRAWINGS

FIG. 7 illustrates a relationship of the turbidity of a light guide plate with how a background is seen and the brightness of a screen. To be more specific, (A) illustrates a relationship between how the background is seen and the brightness of the screen when the turbidity is high, and (B) illustrates how the background is seen and the brightness of the screen when the turbidity is low.

FIG. 16 illustrates advantageous effects of the first embodiment in comparison to those in the cases of the first and second base studies.

FIG. 17 is a sectional view illustrating a configuration of a display included in a liquid-crystal display device according to a second embodiment.

FIG. 18 illustrates light ray trajectories obtained when light incident from a back surface side is transmitted to a front surface side in the display illustrated in FIG. 17.

FIG. 25 illustrates advantageous effects of the third embodiment in comparison to those in the cases of the first and second base studies.

FIG. 26 is a sectional view illustrating a configuration of a display included in a liquid-crystal display device according to the fourth embodiment.

DESCRIPTION OF EMBODIMENTS

1. Base Studies

Prior to describing embodiments, first and second base studies conducted by the inventor to clarify the problems of a conventional liquid-crystal display device that functions as a see-through display will be described.
<1.1 First Base Study>

Figure 1:
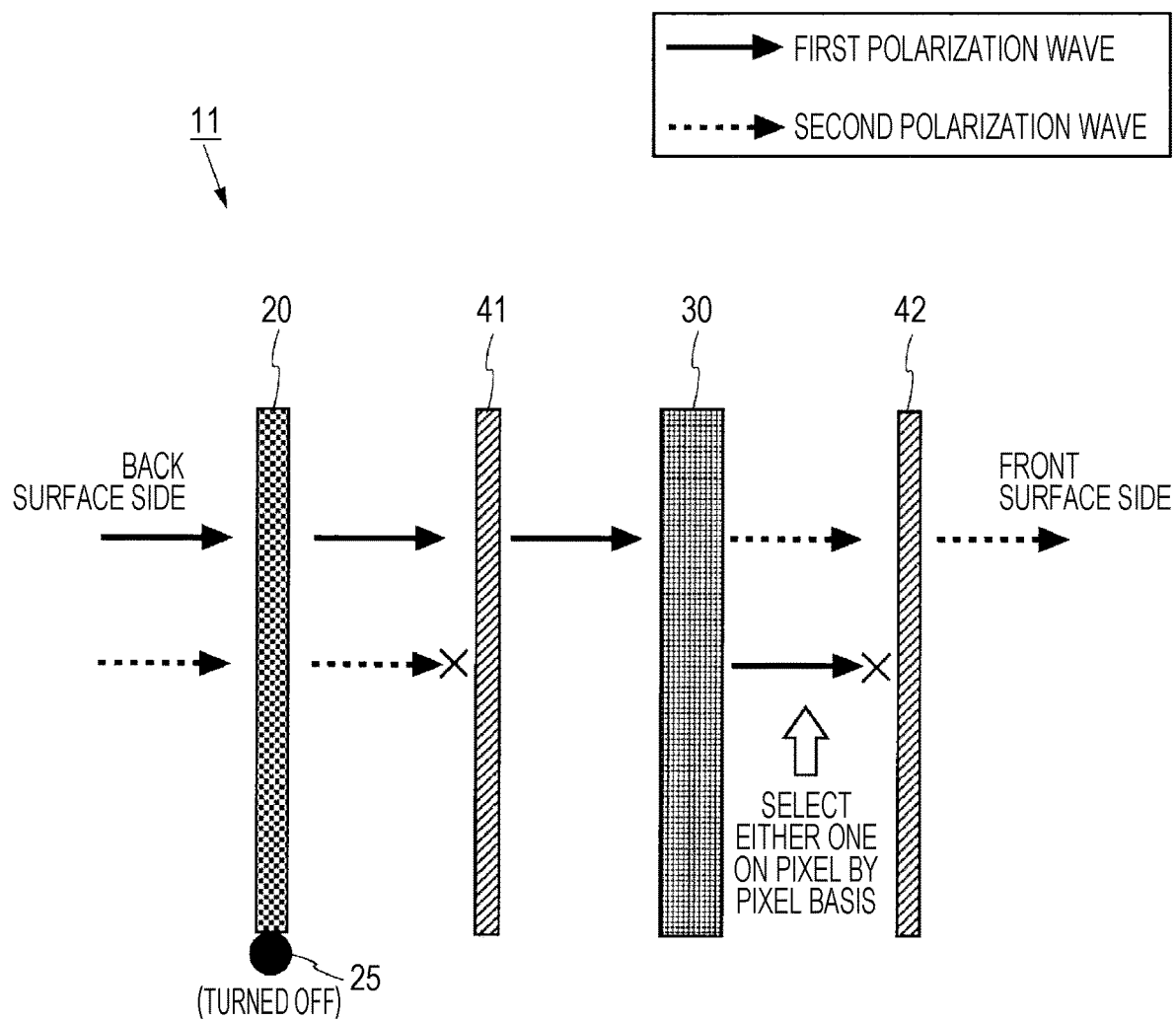
FIG. 1 illustrates light ray trajectories obtained when light incident from a back surface side is transmitted to a front surface side in a display used in a first base study.

FIG. 1 illustrates light ray trajectories obtained when light incident from a back surface side is transmitted to a front surface side in a display 11 used in the first base study. As illustrated in FIG. 1, in the display 11, a second absorptive polarization plate 42, a liquid-crystal panel 30, a first absorptive polarization plate 41, and a light guide plate 20 are disposed from the front surface side toward the back surface side. The liquid-crystal panel 30 is a normally white panel that is driven in a TN (Twisted Nematic) system.

Since the liquid-crystal panel 30 is driven in a TN system, each pixel in the liquid-crystal panel 30 rotates, by 90 degrees, the polarization axis of a polarization wave incident while in a non-driven state (off state) and outputs the resultant polarization wave. The non-driven state is either a state in which a signal voltage corresponding to an image signal DV is not being written or a state in which a signal voltage of 0 V is being written. Upon entering a driven state (on state) in which a maximum signal voltage is written, the liquid-crystal panel 30 outputs a polarization wave as-is without rotating the polarization axis thereof. When a voltage value of a written signal voltage is an intermediate value of the aforementioned two, a polarization wave having its polarization axis rotated by 90 degrees and a polarization wave without having its polarization axis rotated are output at a ratio corresponding to the voltage value.

In the display 11, the first absorptive polarization plate 41 is disposed at a rear surface side of the liquid-crystal panel 30, and the second absorptive polarization plate 42 having a transmission axis orthogonal to the transmission axis of the first absorptive polarization plate 41 is disposed at a display surface side. Therefore, a first polarization wave incident on an off-state pixel has its polarization axis rotated upon passing through the pixel to result in a second polarization wave and is transmitted through the second absorptive polarization plate 42 to exit to the front surface side. Meanwhile, a first polarization wave incident on an on-state pixel is output as-is and absorbed by the second absorptive polarization plate 42. In the drawings illustrating the light ray trajectories in the present application, "x" is appended at the head of an arrow indicating the traveling direction of a polarization wave absorbed by an absorptive polarization plate.

With reference to FIG. 1, light ray trajectories of light incident from the back surface side while a light source 25 attached to the light guide plate 20 is being turned off (off) and the liquid-crystal panel 30 is in a driven state will be described. For example, the light source 25, such as an LED (Light Emitting Device), is attached to an end portion of the light guide plate 20, and the light source 25 is being turned off in FIG. 1.

As illustrated in FIG. 1, a first polarization wave and a second polarization wave included in the light incident from the back surface side are transmitted through the light guide plate 20 and become incident on the first absorptive polarization plate 41. The first polarization wave is transmitted through the first absorptive polarization plate 41, and the second polarization wave is absorbed thereby. The first polarization wave transmitted through the first absorptive polarization plate 41 is incident on the liquid-crystal panel 30. Since the liquid-crystal panel 30 is of a TN system, of the first polarization wave incident on the liquid-crystal panel 30, the first polarization wave incident on an off-state pixel has its polarization axis rotated by the liquid-crystal panel 30 to be converted into the second polarization wave and is then emitted. The first polarization wave incident on an on-state pixel is emitted as-is as the first polarization wave without having its polarization axis rotated. The second polarization wave emitted from the liquid-crystal panel 30 is transmitted through the second absorptive polarization plate 42, and the first polarization wave is absorbed by the second absorptive polarization plate 42. Thus, only the second polarization wave that has been transmitted through off-state pixels is transmitted to the front surface side. As a result, a viewer present at the front surface side can see a state of the back surface side at positions corresponding to the off-state pixels and can see a screen in which black display appears at positions corresponding to the on-state pixels.

Figure 2:
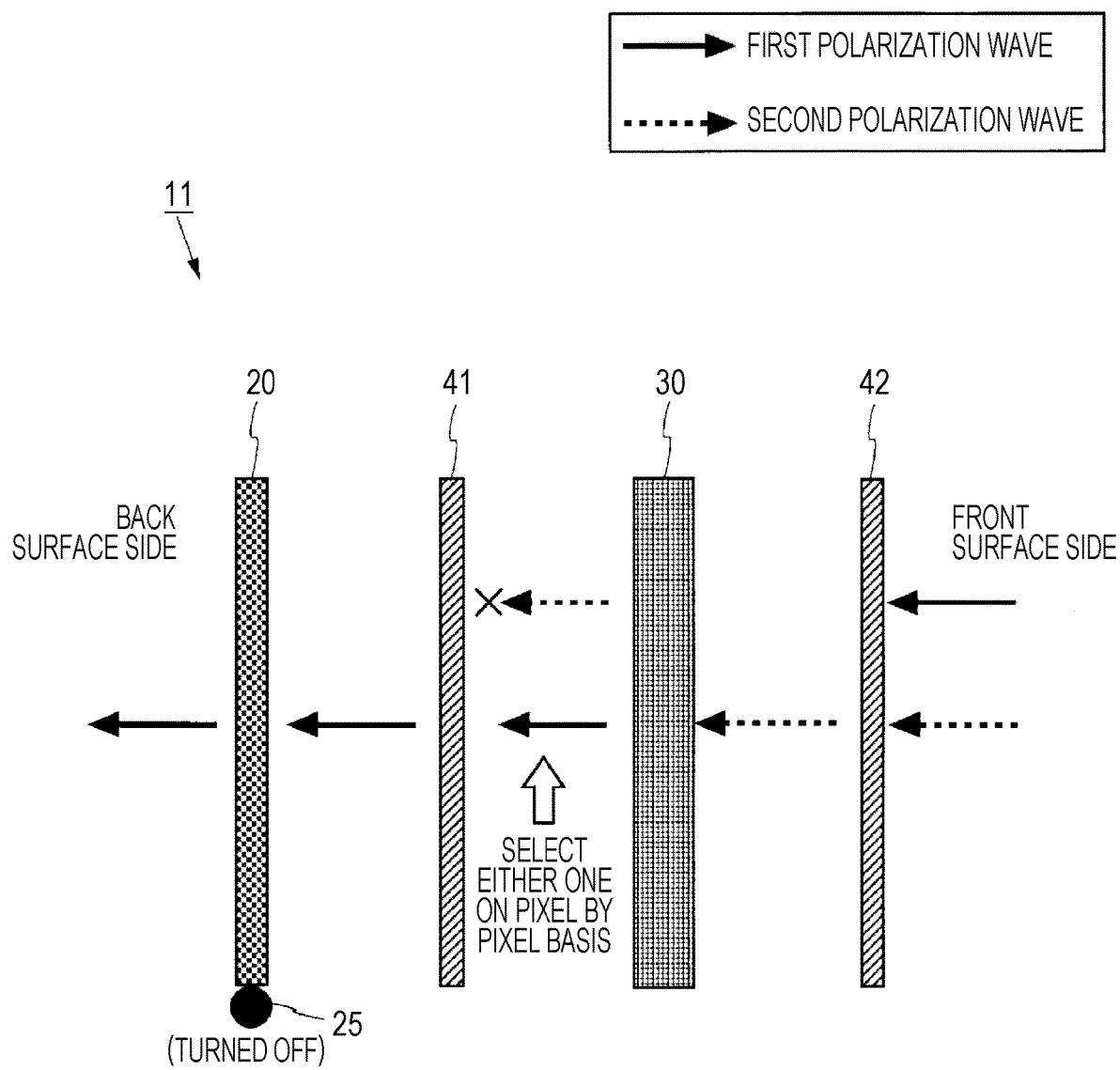
FIG. 2 illustrates light ray trajectories obtained when light incident from the front surface side is transmitted to the back surface side in the display illustrated in FIG. 1.

FIG. 2 illustrates light ray trajectories obtained when light incident from the front surface side is transmitted to the back surface side in the display 11 illustrated in FIG. 1. With reference to FIG. 2, light ray trajectories obtained when light is incident from the front surface side while the light source 25 attached to the end portion of the light guide plate 20 is being turned off and the liquid-crystal panel 30 is in a driven state will be described. As illustrated in FIG. 2, of the light incident on the second absorptive polarization plate 42 from the front surface side, the first polarization wave is absorbed by the second absorptive polarization plate 42, and the second polarization wave is transmitted through the second absorptive polarization plate 42 to become incident on the liquid-crystal panel 30. Of the second polarization wave incident on the liquid-crystal panel 30, the second polarization wave incident on an on-state pixel is emitted as-is as the second polarization wave without having its polarization axis rotated by the liquid-crystal panel 30. The second polarization wave incident on an off-state pixel has its polarization axis rotated to be converted into the first polarization wave and is then emitted. These polarization waves are incident on the first absorptive polarization plate 41, the first polarization wave is transmitted through the first absorptive polarization plate 41, and the second polarization wave is absorbed by the first absorptive polarization plate 41. Furthermore, the first polarization wave is transmitted through the light guide plate 20 to reach the back surface side. As a result, a viewer present at the back surface side can see a state of the front surface side at positions corresponding to the off-state pixels and can see a state in which black display appears at positions corresponding to the on-state pixels. In this manner, the light ray trajectories illustrated in FIG. 1 and FIG. 2 reveal that the display 11 functions as a see-through display.

Figure 3:
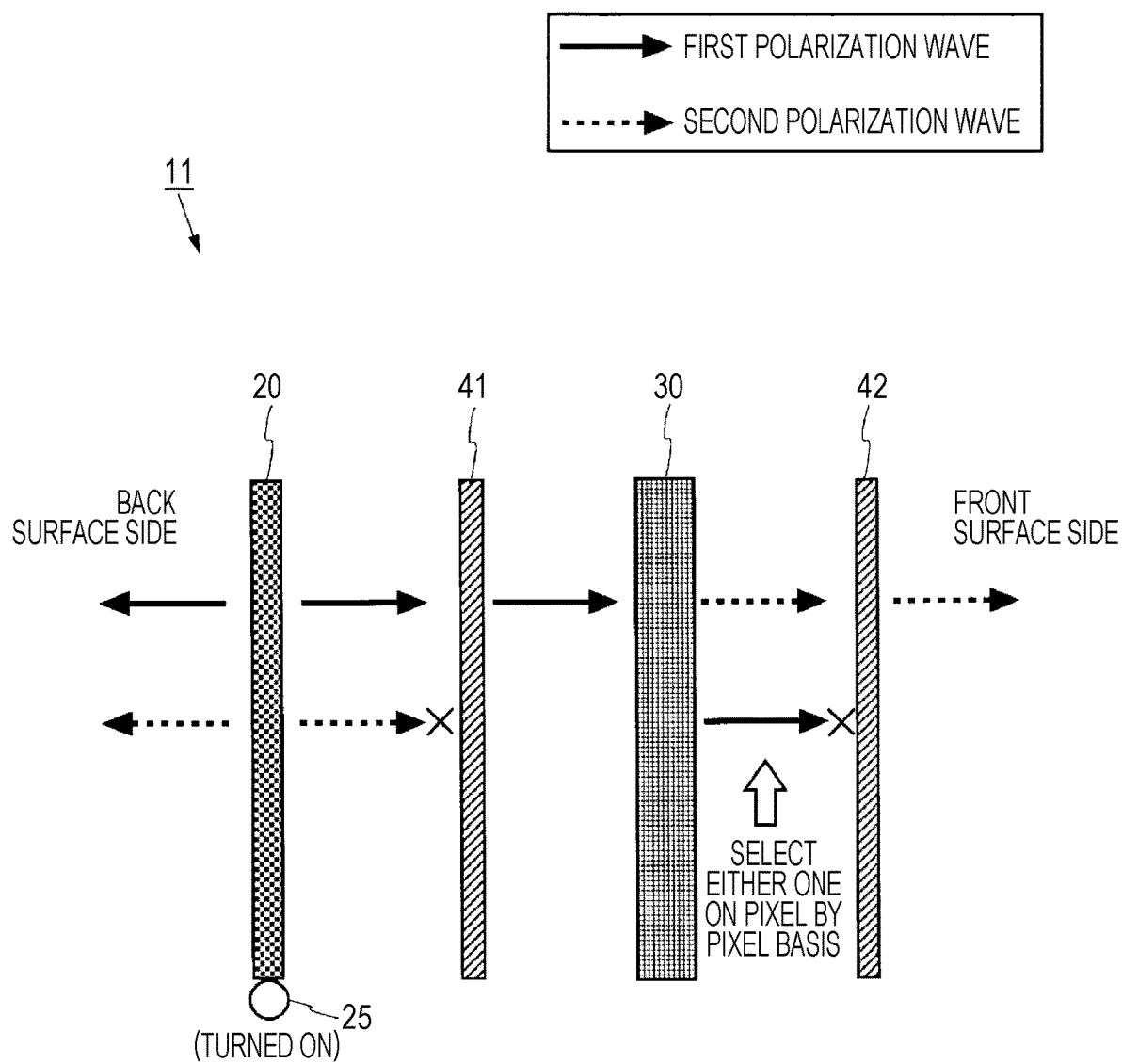
FIG. 3 illustrates light ray trajectories obtained when light emitted from a light guide plate while a light source is being turned on is transmitted to the front surface side and the back surface side in the display illustrated in FIG. 1.

FIG. 3 illustrates light ray trajectories obtained when light emitted from the light guide plate 20 while the light source 25 is being turned on is emitted to the front surface side and the back surface side in the display 11 illustrated in FIG. 1. With reference to FIG. 3, light ray trajectories of light emitted from the light source 25 while the light source 25 attached to the light guide plate 20 is being turned on (on) and the liquid-crystal panel 30 is in a driven state will be described. The light emitted from the light source 25 includes the first polarization wave and the second polarization wave. Upon entering the light guide plate 20, the light travels while undergoing total reflection inside the light guide plate 20 and is emitted from the front surface and the back surface of the light guide plate 20 to the display surface side and the back surface side of the display 11. As illustrated in FIG. 3, the first polarization wave and the second polarization wave emitted from the light guide plate 20 to the back surface side are transmitted as-is to the back surface side. Therefore, a viewer present at the back surface side experiences glare upon seeing the display 11.

The first polarization wave and the second polarization wave emitted to the display surface side are incident on the first absorptive polarization plate 41. The light ray trajectories from a point where these polarization waves are incident on the first absorptive polarization plate 41 to a point where only the second polarization wave reaches the front surface side are the same as in the case illustrated in FIG. 1, and thus descriptions thereof will be omitted. As a result, a viewer present at the front surface side can see a luminous state at positions corresponding to the off-state pixels and can see a screen in which black display appears at positions corresponding to the on-state pixels.

According to the first base study, when the light source 25 is turned on, the first polarization wave included in the light emitted from the light guide plate 20 to the display surface side contributes to the brightness of the screen, but the second polarization wave is absorbed by the first absorptive polarization plate 41 and does not contribute to the brightness of the screen. In addition, neither of the first and second polarization waves emitted from the light guide plate 20 to the back surface side contributes to the brightness of the screen. In this manner, a large portion of the light emitted from the light source 25 fails to contribute to the brightness of the display surface, which thus poses a problem of low light utilization efficiency. Furthermore, the light emitted from the light guide plate 20 to the back surface side often has a peak of brightness in a specific angular direction relative to the light guide plate 20, although it depends on the structure of the display 11. In this case, if a viewer sees the rear surface of the display 11 in the stated angular direction, the brightness is highest in this direction, which thus poses another problem in that the viewer is more likely to experience stress associated with glare.

<1.2 Second Base Study>

Figure 4:
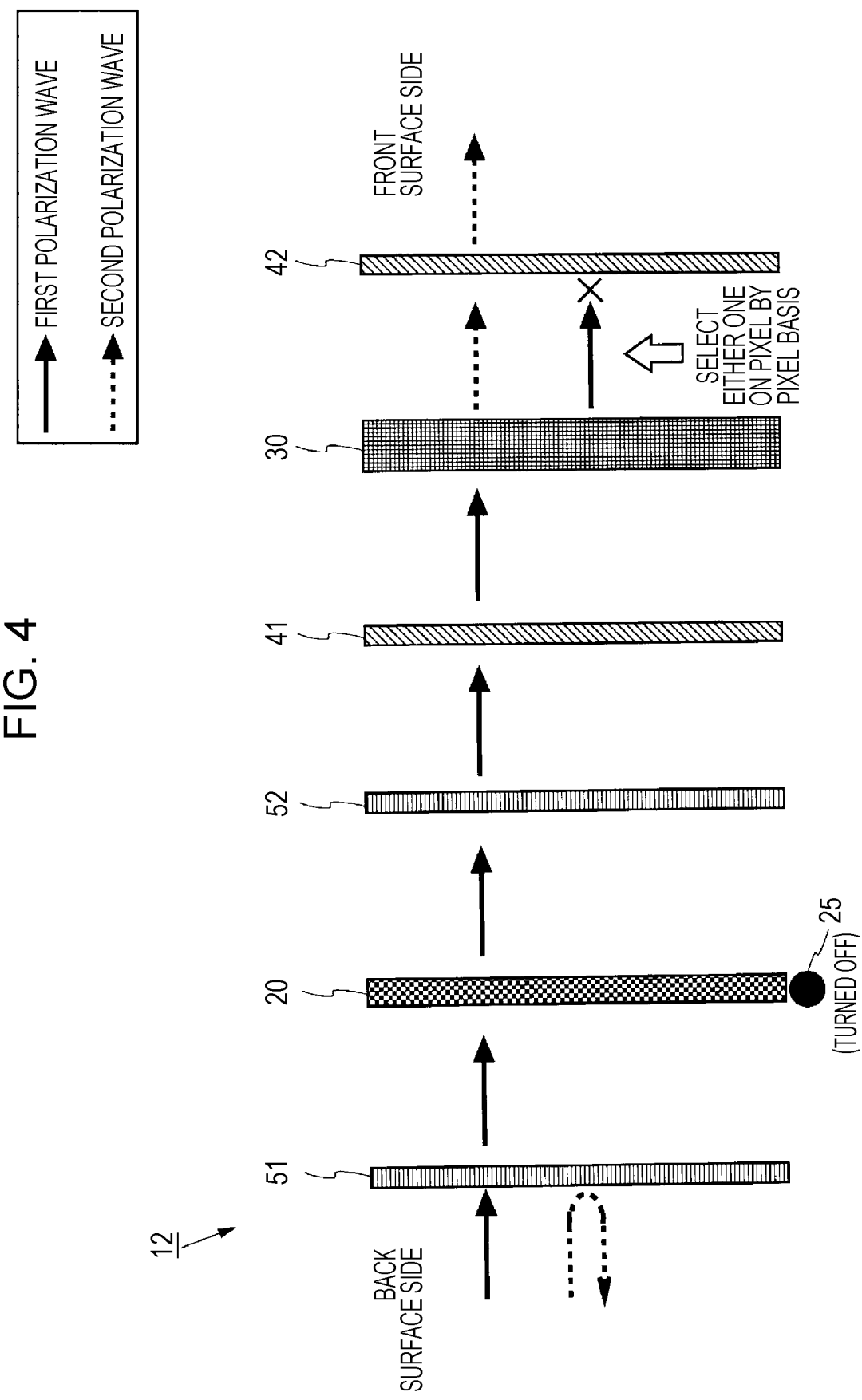
FIG. 4 illustrates light ray trajectories obtained when light incident from a back surface side is transmitted to a front surface side in a display used in a second base study.

FIG. 4 illustrates light ray trajectories obtained when light incident from a back surface side is transmitted to a front surface side in a display 12 used in the second base study. As illustrated in FIG. 4, in the display 12, a second absorptive polarization plate 42, a liquid-crystal panel 30, a first absorptive polarization plate 41, a second reflective polarization plate 52, a light guide plate 20, and a first reflective polarization plate 51 are disposed from the front surface side toward the back surface side. The liquid-crystal panel 30 is a normally white panel that is driven in a TN system. In this manner, in the display 12, the two first and second reflective polarization plates 51 and 52 that sandwich the light guide plate 20 and that each have a transmission axis in the same direction as the transmission axis of the first absorptive polarization plate 41 are further added to the display 11 illustrated in FIG. 1. In this case, the first and second reflective polarization plates 51 and 52 transmit the first polarization wave and reflect the second polarization wave.

With reference to FIG. 4, light ray trajectories of light incident from the back surface side while a light source 25 attached to an end portion of the light guide plate 20 is being turned off and the liquid-crystal panel 30 is in driven state will be described. The second polarization wave incident on the first reflective polarization plate 51 from the back surface side is reflected by the first reflective polarization plate 51 and directed back to the back surface side.

Since the transmission axes of the first and second reflective polarization plates 51 and 52 are in the same direction as the transmission axis of the first absorptive polarization plate 41, the first polarization wave incident from the back surface side is transmitted successively through the first reflective polarization plate 51, the light guide plate 20, the second reflective polarization plate 52, and the first absorptive polarization plate 41 and becomes incident on the liquid-crystal panel 30. The light ray trajectories of the first polarization wave incident on the liquid-crystal panel 30 are the same as in the case illustrated in FIG. 1 described in the first base study, and thus descriptions thereof will be omitted. Thus, only the first polarization wave transmitted through an off-state pixel is converted to the second polarization wave and transmitted to the front surface side. As a result, a viewer present at the front surface side can see a state of the back surface side at positions corresponding to the off-state pixels and can see a screen in which black display appears at positions corresponding to the on-state pixels.

Figure 5:
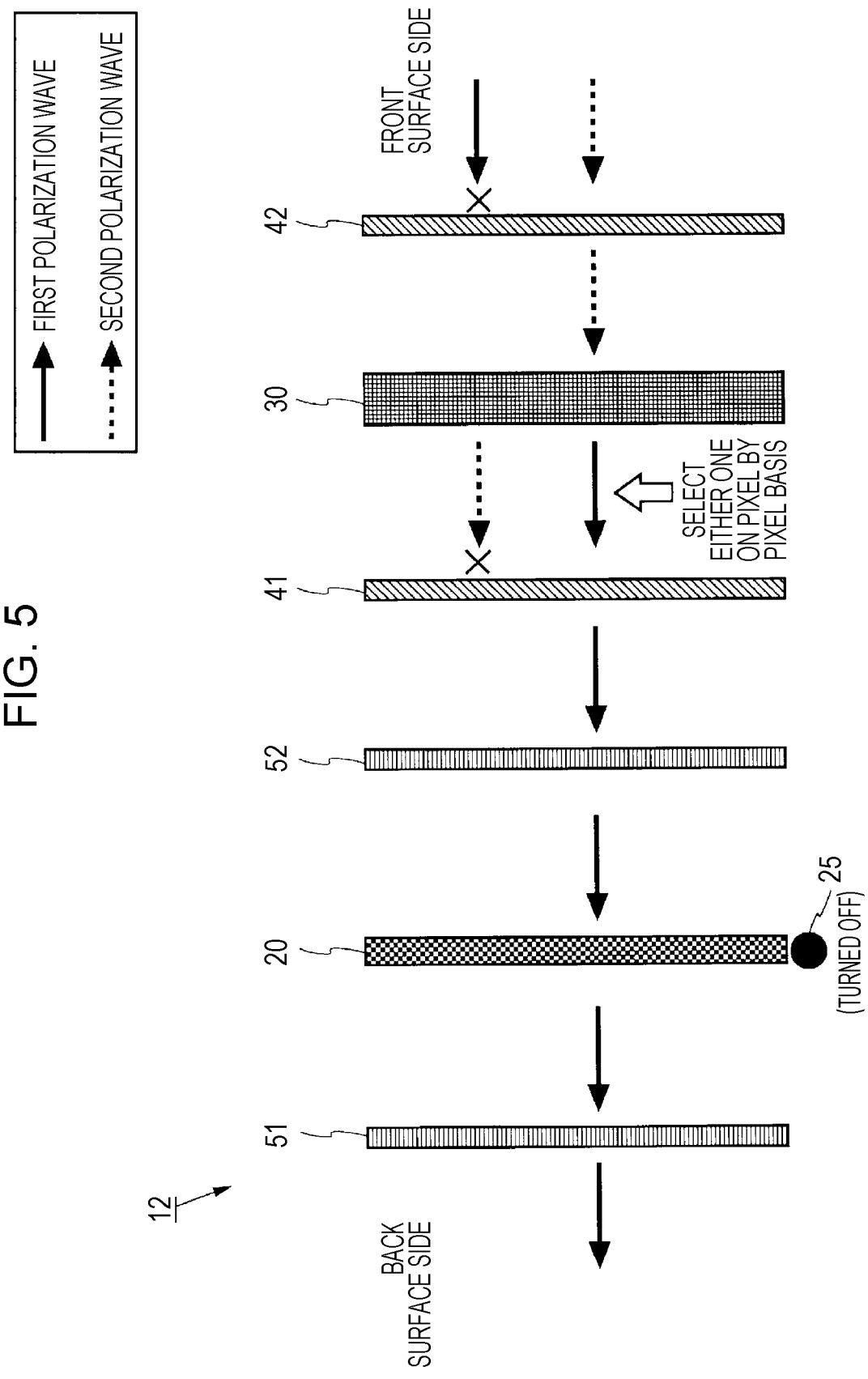
FIG. 5 illustrates light ray trajectories obtained when light incident from the front surface side is transmitted to the back surface side in the display illustrated in FIG. 4.

FIG. 5 illustrates light ray trajectories obtained when light incident from the front surface side is transmitted to the back surface side in the display 12 illustrated in FIG. 4. With reference to FIG. 5, light ray trajectories of light incident from the front surface side while a light source 25 attached to the end portion of the light guide plate 20 is being turned off and the liquid-crystal panel 30 is in a driven state will be described. As illustrated in FIG. 5, the first polarization wave incident on the second absorptive polarization plate 42 from the front surface side is absorbed by the second absorptive polarization plate 42, and the second polarization wave is transmitted through the second absorptive polarization plate 42 and becomes incident on the liquid-crystal panel 30. The light ray trajectory of the second polarization wave incident on the liquid-crystal panel 30 are the same as in the case illustrated in FIG. 2 described in the first base study, and thus descriptions thereof will be omitted. Thus, the first polarization wave and the second polarization wave are emitted from the liquid-crystal panel 30 and become incident on the first absorptive polarization plate 41. The first polarization wave is transmitted through the first absorptive polarization plate 41 and becomes incident on the second reflective polarization plate 52, and the second polarization wave is absorbed by the first absorptive polarization plate 41.

Since the transmission axes of the second reflective polarization plate 52 and the first reflective polarization plate 51 are in the same direction as the transmission axis of the first absorptive polarization plate 41, the first polarization wave is transmitted successively through the second reflective polarization plate 52, the light guide plate 20 and the first reflective polarization plate 51 to be transmitted to the back surface side. As a result, a viewer present at the back surface side can see a state of the front surface side at positions corresponding to the off-state pixels and can see a screen in which black display appears at positions corresponding to the on-state pixels. In this manner, the light ray trajectories illustrated in FIG. 4 and FIG. 5 reveal that the display 12 also functions as a see-through display.

Figure 6:
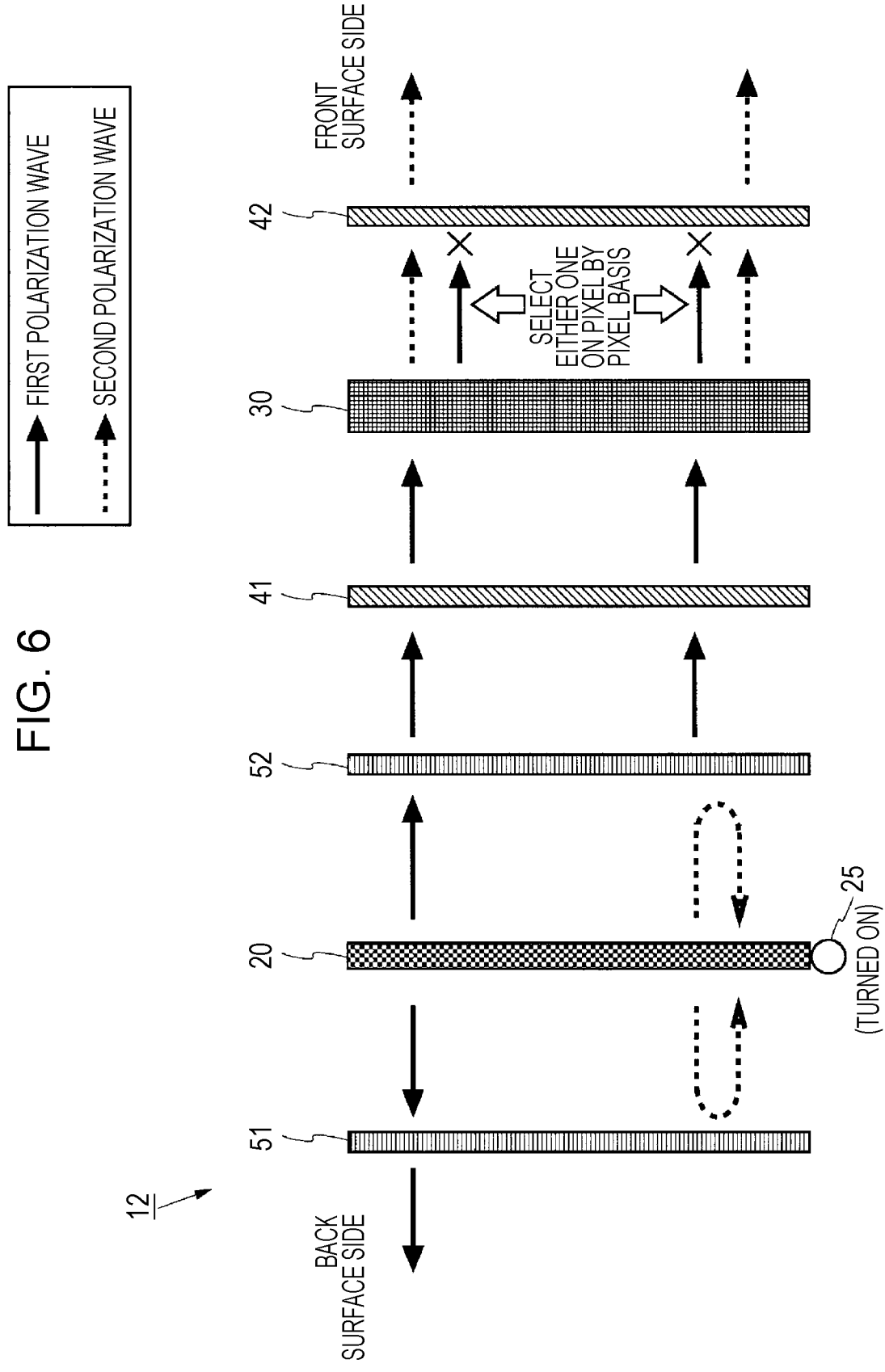
FIG. 6 illustrates light ray trajectories obtained when light emitted from a light guide plate while a light source is being turned on is transmitted to the front surface side and the back surface side in the display illustrated in FIG. 4.

FIG. 6 illustrates light ray trajectories obtained when light emitted from the light guide plate 20 while the light source 25 is being turned on is transmitted to the front surface side and the back surface side in the display 12 illustrated in FIG. 4. With reference to FIG. 6, light ray trajectories of light emitted from the light guide plate 20 to the display surface side and the rear surface side while the light source 25 attached to the end portion of the light guide plate 20 is being turned on and the liquid-crystal panel 30 is in a driven state will be described.

With reference to FIG. 6, the first polarization wave emitted from the light guide plate 20 to the rear surface side is transmitted through the first reflective polarization plate 51 to exit to the back surface side. Meanwhile, the first polarization wave emitted to the display surface side is transmitted through the second reflective polarization plate 52 and becomes incident on the first absorptive polarization plate 41. The light ray trajectories up to a point where the first polarization wave incident on the first absorptive polarization plate 41 is transmitted through the second absorptive polarization plate 42 to be transmitted to the front surface side are the same as the light ray trajectories illustrated in FIG. 3, and thus descriptions thereof be omitted. Thus, the first polarization wave transmitted through an off-state pixel is converted to the second polarization wave by the liquid-crystal panel 30 and transmitted through the second absorptive polarization plate 42 to exit to the front surface side. The first polarization wave transmitted through an on-state pixel is incident on the second absorptive polarization plate 42 as-is as the first polarization wave and is absorbed thereby.

The second polarization wave emitted from the light guide plate 20 to the rear surface side is reflected by the first reflective polarization plate 51 and becomes incident on the light guide plate 20. The second polarization wave incident on the light guide plate 20 has turbulence produced therein upon passing through the polarization scattering element within the light guide plate 20 and results in a generation of a combined wave that includes the first polarization wave and the second polarization wave. The generated combined wave is emitted toward the second reflective polarization plate 52. The first polarization wave included in the combined wave is transmitted through the second reflective polarization plate 52 and becomes incident on the first absorptive polarization plate 41. The light ray trajectories from a point where the first polarization wave is incident on the first absorptive polarization plate 41 to a point where the light is transmitted to the front surface side are the same as the light ray trajectories of the first polarization wave emitted from the light guide plate 20 to the front surface side described above, and thus descriptions thereof will be omitted.

The second polarization wave included in the combined wave is reflected by the second reflective polarization plate 52 and becomes incident on the light guide plate 20. As the second polarization wave incident on the light guide plate 20 passes again through the polarization scattering element within the light guide plate 20, a combined wave that includes the first polarization wave and the second polarization wave is generated, and the combined wave is emitted to the first reflective polarization plate 51. The first polarization wave included in the combined wave is transmitted through the first reflective polarization plate 51 to exit to the back surface side. Meanwhile, the second polarization wave is reflected by the first reflective polarization plate 51 and becomes incident on the light guide plate 20. In this manner, as the second polarization wave reflected by the first or second reflective polarization plate 51 or 52 passes through the polarization scattering element within the light guide plate 20, generation of a combined wave that includes the first polarization wave and the second polarization wave is repeated. The light ray trajectories of the second polarization wave emitted from the light guide elate 20 to the display surface side are also substantially the same as in the case of the second polarization wave emitted to the rear surface side as described above, and thus descriptions thereof will be omitted.

In this manner, the first polarization wave emitted from the light guide plate 20 to the display surface side and the first polarization wave included in the combined wave generated from the second polarization wave emitted from the light guide plate 20 to the rear surface side or the display surface side are converted to the second polarization wave upon being incident on an off-state pixel in the liquid-crystal panel 30 and are further transmitted through the second absorptive polarization plate 42 to exit to the front surface side. Thus, a luminous state is displayed at a position corresponding to an off-state pixel in the liquid-crystal panel 30. In addition, the first polarization wave incident on an on-state pixel is emitted as-is as the first polarization wave and thus absorbed by the second absorptive polarization plate 42. Thus, black display appears at a position corresponding to an on-state pixel.

According to the second base study, not only the first polarization wave emitted from the light guide plate 20 to the display surface side but also the second polarization wave emitted to the display surface side and the rear surface side has turbulence produced therein upon passing through the polarization scattering element within the light guide plate 20. Thus, the combined wave that includes the first polarization wave and the second polarization wave is generated from the second polarization wave, and the first polarization wave included in the combined wave is also transmitted to the front surface side. In this case, in order to further improve the light utilization efficiency, the proportion of the first polarization wave included in the combined wave needs to be increased by increasing the polarization scattering element. To achieve ideal light utilization efficiency, the ratio of the first polarization wave and the second polarization wave included in the combined wave generated from the second polarization wave within the light guide plate 20 preferably satisfies the following expression (1).

$$\text{first polarization wave:second polarization wave}=1:1 \tag{1}$$

The use of the light guide plate 20 that includes a large amount of polarization scattering element to satisfy the expression (1) leads to an improvement in the utilization efficiency of the second polarization wave; thus, the quantity of light of the second polarization wave transmitted to the front surface side increases, and the screen becomes brighter as a result. However, the turbidity that indicates the transparency of the light guide plate 20 increases as well. An increase in the turbidity leads to a problem in that the screen as a whole becomes opaque to make the background blurry and less visible when the back surface side of the display 12 is seen from its front surface side.

Meanwhile, reducing the polarization scattering element leads to a decrease in the turbidity, which thus makes the screen less opaque and makes the background more visible. However, since the proportion of the first polarization wave included in the combined wave generated from the second polarization wave is reduced, the utilization efficiency of the second polarization wave cannot be improved. In addition, the quantity of light of the first polarization wave transmitted to the back surface side increases as compared to the first base study, and thus the problem that the viewer experiences more glare when seeing the display 12 from the back surface side is not solved, either.

FIG. 7 illustrates a relationship of the turbidity of the light guide plate 20 with how the background is seen and the brightness of the screen. To be more specific, FIG. 7(A) illustrates how the background is seen and the brightness of the screen when the turbidity is high, and FIG. 7(B) illustrates how the background is seen and the brightness of the screen when the turbidity is low. As illustrated in FIG. 7(A), when the turbidity is high, the screen is bright, but the background is blurred. However, as illustrated in FIG. 7(B), when the turbidity is reduced, the background can be seen more clearly, but the screen becomes dimmer.

2. First Embodiment

Figure 8:
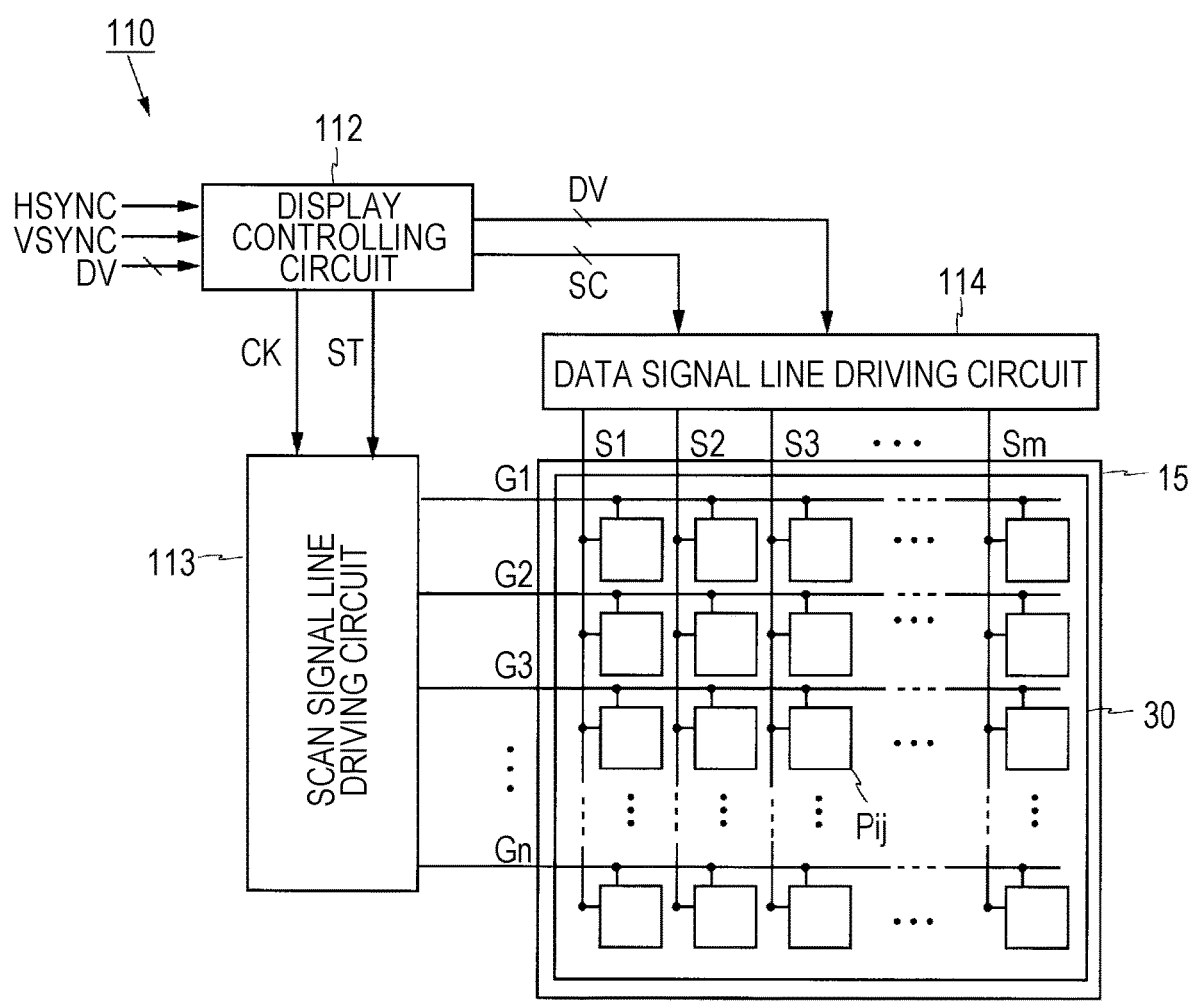
FIG. 8 is a block diagram illustrating a configuration of a liquid-crystal display device according to a first embodiment.

FIG. 8 is a block diagram illustrating a configuration of a liquid-crystal display device 110 according to a first embodiment.

<2.1 Configuration and Operation of Display Device>

In the present invention, a well-known liquid-crystal display device is used as the liquid-crystal display device 110 that includes a display device described in detail in each embodiment below. Therefore, a configuration of the liquid-crystal display device 110 will be described briefly.

FIG. 8 is a block diagram illustrating a configuration of the liquid-crystal display device 110 including a display 15, which will be described later. As illustrated in FIG. 8, the liquid-crystal display device 110 is an active-matrix display device that includes a first display 15, a second display, a display controlling circuit 112, a first scan signal line driving circuit 113, a second scan signal line driving circuit 113, a first data signal line driving circuit 114, a second data signal line driving circuit 114, and a backlight light source. The first display and the second display are disposed on top of the other with a light guide interposed therebetween. The first display 15 includes a liquid-crystal panel and polarization plates affixed to two surfaces of the liquid-crystal panel, and the second display 15 includes a liquid-crystal panel and polarization plates affixed to two surfaces of the liquid-crystal panel, but depictions thereof are omitted in the drawing.

A liquid-crystal panel 30 of the first display includes n scan signal lines G1 to Gn, m data signal lines S1 to Sm, and (m×n) pixels Pij (herein, m is an integer no smaller than 2, and j is an integer no smaller than 1 nor greater than m). The scan signal lines G1 to Gn are disposed parallel to each other, and the data signal lines S1 to Sm are disposed orthogonal to the scan signal lines G1 to Gn and parallel to each other. A pixel Pij is disposed in the vicinity of an intersection of a scan signal line G1 and a data signal line Sj. In this manner, the (m×n) pixels Pij are disposed two-dimensionally with m pixels Pij arrayed in the row direction and with n pixels Pij arrayed in the column direction. The scan signal line G1 is connected in common to the pixels Pij disposed in an i-th row, and the data signal line Sj is connected in common to the pixels Pij disposed in a j-th column. In a similar manner, a liquid-crystal panel of the second display includes n scan signal lines G1 to Gn, m data signal lines S1 to Sm, and (m×n) pixels Pij, and the dimensions of a pixel formation portion of one liquid-crystal panel and the dimensions of a pixel formation portion of the other liquid-crystal panel are the same.

The drawing is an exploded perspective view illustrating a state in which a liquid-crystal panel, a light guide, and another liquid-crystal panel are stacked on each other. As illustrated, the two liquid-crystal panels are disposed on top of the other with the light guide interposed therebetween. Therefore, when the display is seen from the front, the two liquid-crystal panels, superposed on top of the other, seem as if they are a single liquid-crystal panel.

A horizontal synchronization signal HSYNC, a vertical synchronization signal VSYNC, and an image signal DV are supplied to the display controlling circuit from the outside of the liquid-crystal display device 110. On the basis of these signals, the display controlling circuit 112 generates a control signal for controlling the first and second scan signal line driving circuits 113 and a control signal SC for controlling the first and second data signal line driving circuits 114, outputs the control signal to the first and second scan signal line driving circuits 113, and outputs the control signal SC to the first and second data signal line driving circuits 114.

In addition, the display controlling circuit includes a memory that stores an adjusted luminance having been adjusted in advance far each gradation value of a digital image signal and a luminance calculating circuit that reads out the luminance stored in the memory and adjusts the luminance of digital image data. The display controlling circuit outputs an image signal having the luminance corrected for each gradation value by the luminance calculating circuit to the first data signal line driving circuit and the second data signal line driving circuit. The adjustment of the luminance for each gradation value will be described later.

The scan signal line driving circuit 113 provides high-level output signals successively, one by one, to the respective scan signal lines G1 to Gn. Thus, the scan signal lines G1 to Gn are selected successively, one by one, and the pixels Pij in each row are selected at once. The data signal line driving circuit 114 applies a signal voltage corresponding to the image signal DV to the data signal lines S1 to Sm on the basis of the control signal SC and the image signal DV. Thus, the signal voltage corresponding to the image signal DV is written into the pixels Pij in a selected row. In this manner, the liquid-crystal display device 110 displays an image on the liquid-crystal panel 30.

<2.2 Configuration of Display>

Figure 9:
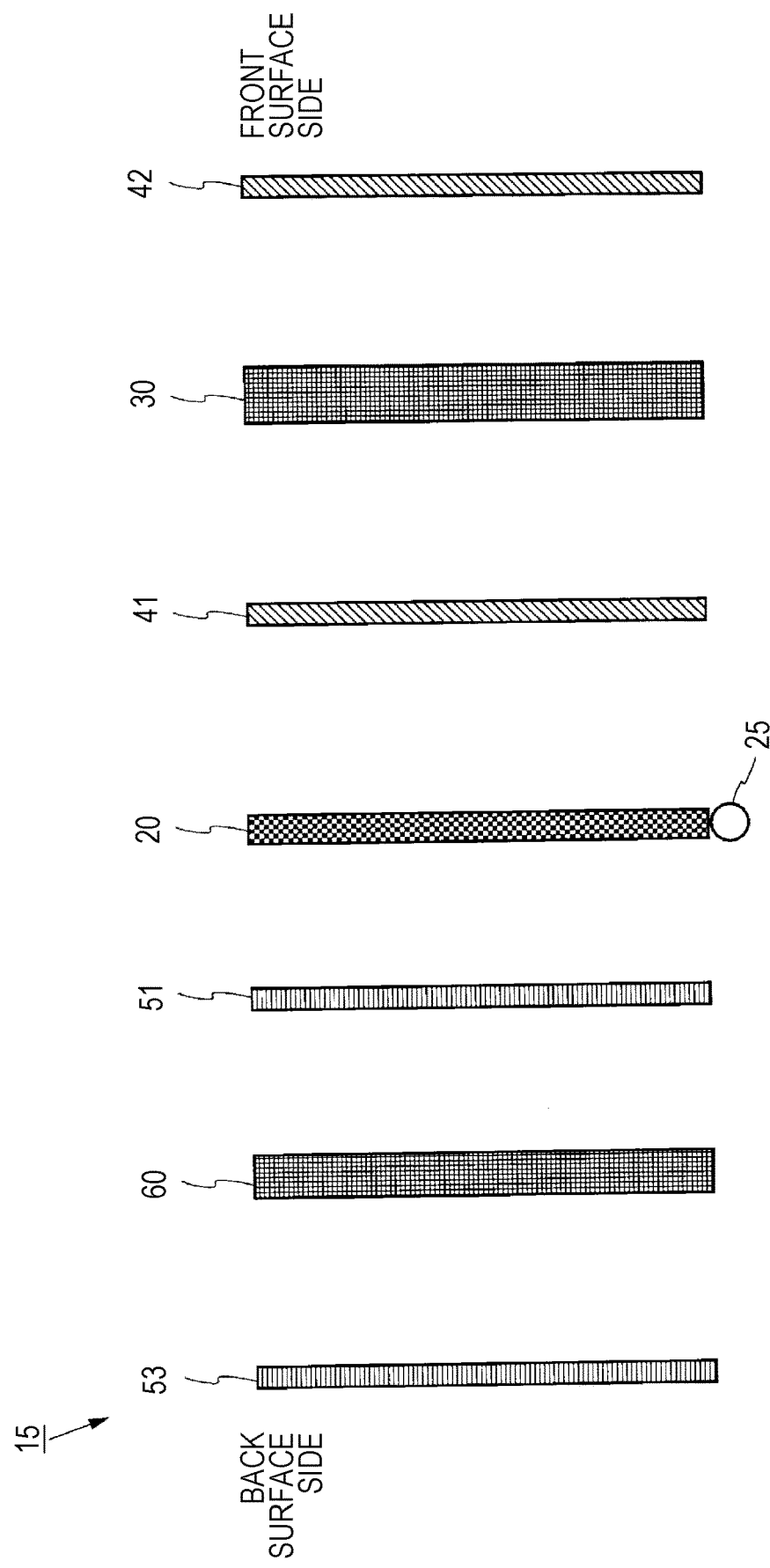
FIG. 9 is a sectional view illustrating a configuration of a display included in the liquid-crystal display device according to the first embodiment.

FIG. 9 is a sectional view illustrating a configuration of the display 15 included in the liquid-crystal display device 110 according to the first embodiment. As illustrated in FIG. 9, in the display 15, a second absorptive polarization plate 42, a first liquid-crystal panel 30, a first absorptive polarization plate 41, a light guide plate 20, a first reflective polarization plate 514, a second liquid-crystal panel 60, and a third reflective polarization plate 536 are disposed in this order from the display surface toward the rear surface. In this manner, in the display 15, the first reflective polarization plate 51, the second liquid-crystal panel 60, and the third reflective polarization plate 53 are further disposed at the rear surface side of the light guide plate 20 in the display 11 illustrated in FIG. 1.

The first liquid-crystal panel 30 is a liquid-crystal panel having a plurality of pixels provided therein, and an on-state pixel emits an incident polarization wave as-is without converting the polarization state thereof. An off-state pixel emits an incident polarization wave upon converting the polarization state thereof. For example, an off-state pixel converts the first polarization wave transmitted through the (first absorptive polarization plate 41 to the second polarization wave. Thus, the first polarization wave transmitted through the first absorptive polarization plate 41 is transmitted through the second absorptive polarization plate 42. Meanwhile, an on-state pixel transmits as-is the first polarization wave transmitted through the first absorptive polarization plate 41. Thus, the first polarization wave transmitted through the first absorptive polarization plate 41 is absorbed by the second absorptive polarization plate 42. It is not only that the pixels carry out a complete conversion from one polarization state to the other polarization state, but the pixels may convert a polarization wave to include the two polarization states. In this case, transmitted through the polarization plate disposed immediately downstream from the first liquid-crystal panel 30 is a portion of the incident light, and thus a halftone image or background can be displayed. Examples of the first liquid-crystal panel 30 having such a function include a liquid-crystal panel of a TN system or of a VA (Vertical Alignment) system, and the first liquid-crystal panel 30 is a liquid-crystal panel of a TN system in the following descriptions.

The light guide plate 20 is made of a transparent resin, such as acryl or polycarbonate, or glass and has a dot pattern formed in its front surface or has a diffusing agent, such as silica, added therein in order to allow the light incoming from the light source 25 to be emitted to the front surface side and the back surface side. For example, an LED, serving as the light source 25, is attached to a side surface of the light guide plate 20. Therefore, when the light source 25 is turned on, the light emitted from the light source 25 enters the light guide plate 20, travels while repeatedly experiencing total reflection at the surface of the light guide plate 20, and is emitted from the light guide plate 20 to the front surface side or the rear surface side upon being incident on the dot pattern or the diffusing agent.

The second liquid-crystal panel 60 is a liquid-crystal panel of a TN system, for example, that is constituted by a single pixel and the entirety of which can be controlled at once. The second liquid-crystal panel 60 transmits incident light as-is without converting the polarization state thereof while in an on state and transmits incident light upon converting the polarization state thereof while in an off state. Specifically, while in an off state, the second liquid-crystal panel 60 converts the incident first polarization wave to the second polarization wave and transmits the second polarization wave or converts the incident second polarization wave to the first polarization wave and transmits the first polarization wave. In this manner, since the entire panel can be controlled at once, the second liquid-crystal panel 60 can be controlled with ease. The second liquid-crystal panel 60 may be a panel that is divided into a plurality of pieces and controlled on a pixel by pixel basis. In this case, the polarization wave can have the polarization state thereof converted on a pixel by pixel basis and be emitted, or the polarization wave can be emitted without having the polarization state thereof converted in place of the second liquid-crystal panel 60 described above, or in place of a liquid-crystal panel of a TN system, a liquid-crystal panel that can control the polarization state, such as a liquid-crystal panel of a VA system, for example, may be used, or a polymer-dispersed liquid-crystal element or the like may be used.

In the present embodiment, the on state and the off state of the second liquid-crystal panel 60 are switched therebetween in accordance with the on/off of the light source 25. Specifically, the second liquid-crystal panel 60 enters the on state when the light source 25 is turned on and is switched to the off state when the light source 25 is turned off. In this manner, as the on/off state of the second liquid-crystal panel 60 are coordinated with the on/off of the light source 25, the proportion of light, of the light emitted from the light guide plate 20, that is transmitted to the display surface side increases, and the light utilization efficiency improves, as will be described later. The coordination may be such that the second liquid-crystal panel 60 enters the off state when the light source 25 is turned on and the second liquid-crystal panel 60 enters the on state when the light source 25 is turned off, but this poses a problem in that the power consumption increases when such a display 15 is used as a see-through display.

In the display 15, the transmission axis of the first reflective polarization plate 51 is in the same direction as the transmission axis of the first absorptive polarization plate 41 and is orthogonal to the transmission axis of the third reflective polarization plate 53. In addition, the transmission axis of the first absorptive polarization plate 41 and the transmission axis of the second absorptive polarization plate 42 are orthogonal to each other.

2. Light Ray Trajectory

Figure 10:
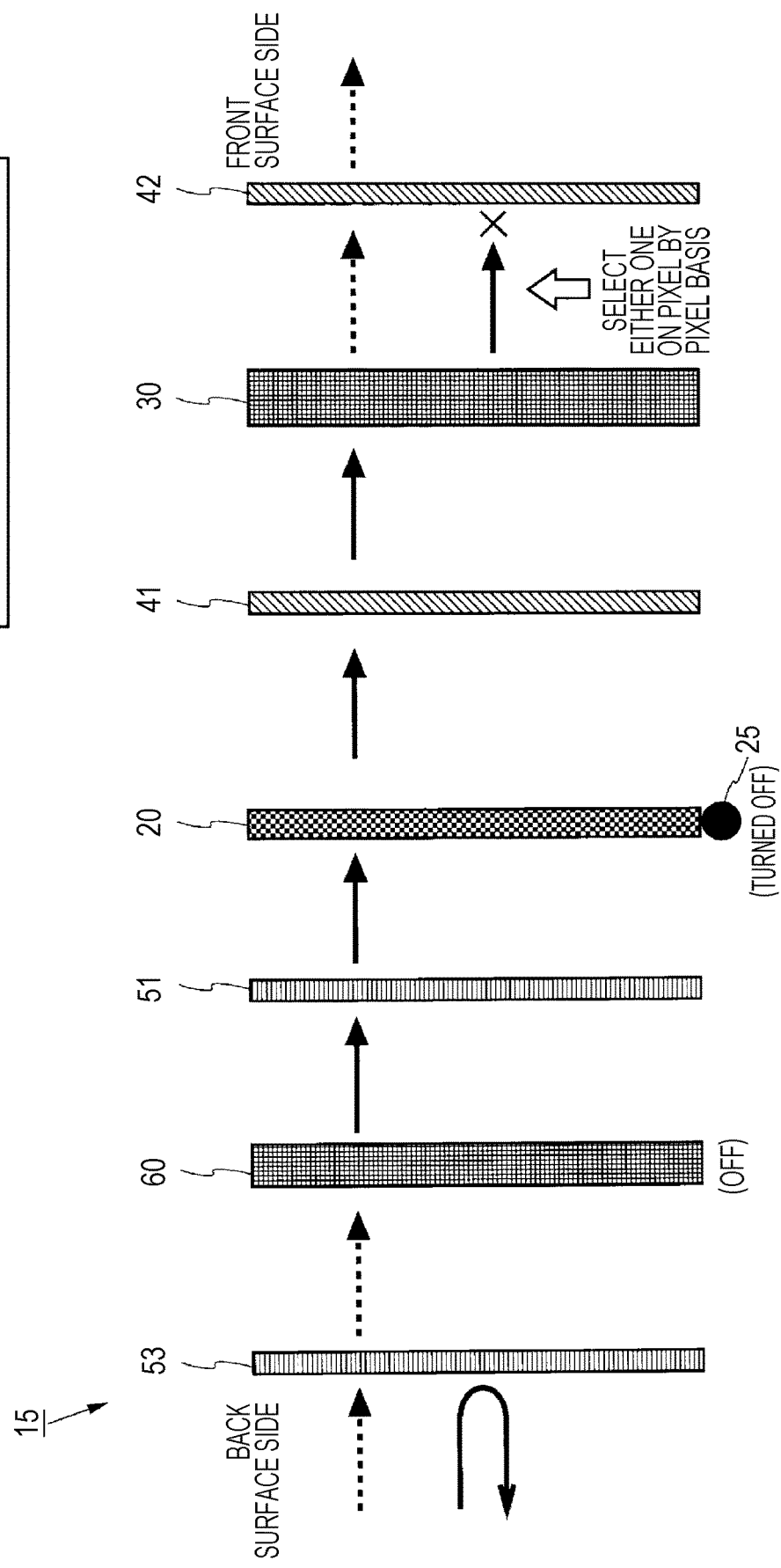
FIG. 10 illustrates light ray trajectories obtained when light incident from aback surface side is transmitted to a front surface side in the display illustrated in FIG. 9.

FIG. 10 illustrates light ray trajectories obtained when light incident from the back surface side is transmitted to the front surface side in the display 15 illustrated in FIG. 9. As illustrated in FIG. 10, the second liquid-crystal panel 60 is in the off state, and the light source 25 is being turned off. The first polarization wave incident from the back surface side is reflected by the third reflective polarization plate 53 to the back surface side. Meanwhile, the second polarization wave incident from the back surface side is transmitted through the third reflective polarization plate 53 and becomes incident on the second liquid-crystal panel 60. Since the second liquid-crystal panel 60 is in the off state, the second polarization wave is transmitted therethrough upon being converted to the first polarization wave. Since the transmission axis of the third reflective polarization plate 53 and the transmission axis of the first reflective polarization plate 51 are in the same direction, the first polarization wave incident on the first reflective polarization plate 51 is transmitted successively through the first reflective polarization plate 51, the light guide plate 20, and the first absorptive polarization plate 41 and becomes incident on the first liquid-crystal panel 30.

The light ray trajectories of the first polarization wave incident on the first liquid-crystal panel 30 are the same as in the case illustrated in FIG. 1 described in the first base study, and thus descriptions thereof will be omitted. Thus, the first polarization wave transmitted through an off-state pixel is converted to the second polarization wave, and this second polarization wave is transmitted through the second absorptive polarization plate 42 to exit to the front surface side. Meanwhile, the first polarization wave transmitted through an on-state pixel is emitted as-is as the first polarization wave without being converted and is absorbed by the second absorptive polarization plate 42. As a result, a viewer present at the front surface side can see a state of the back surface side at positions corresponding to the off-state pixels and can see a screen in which black display appears at positions corresponding to the on-state pixels.

Figure 11:
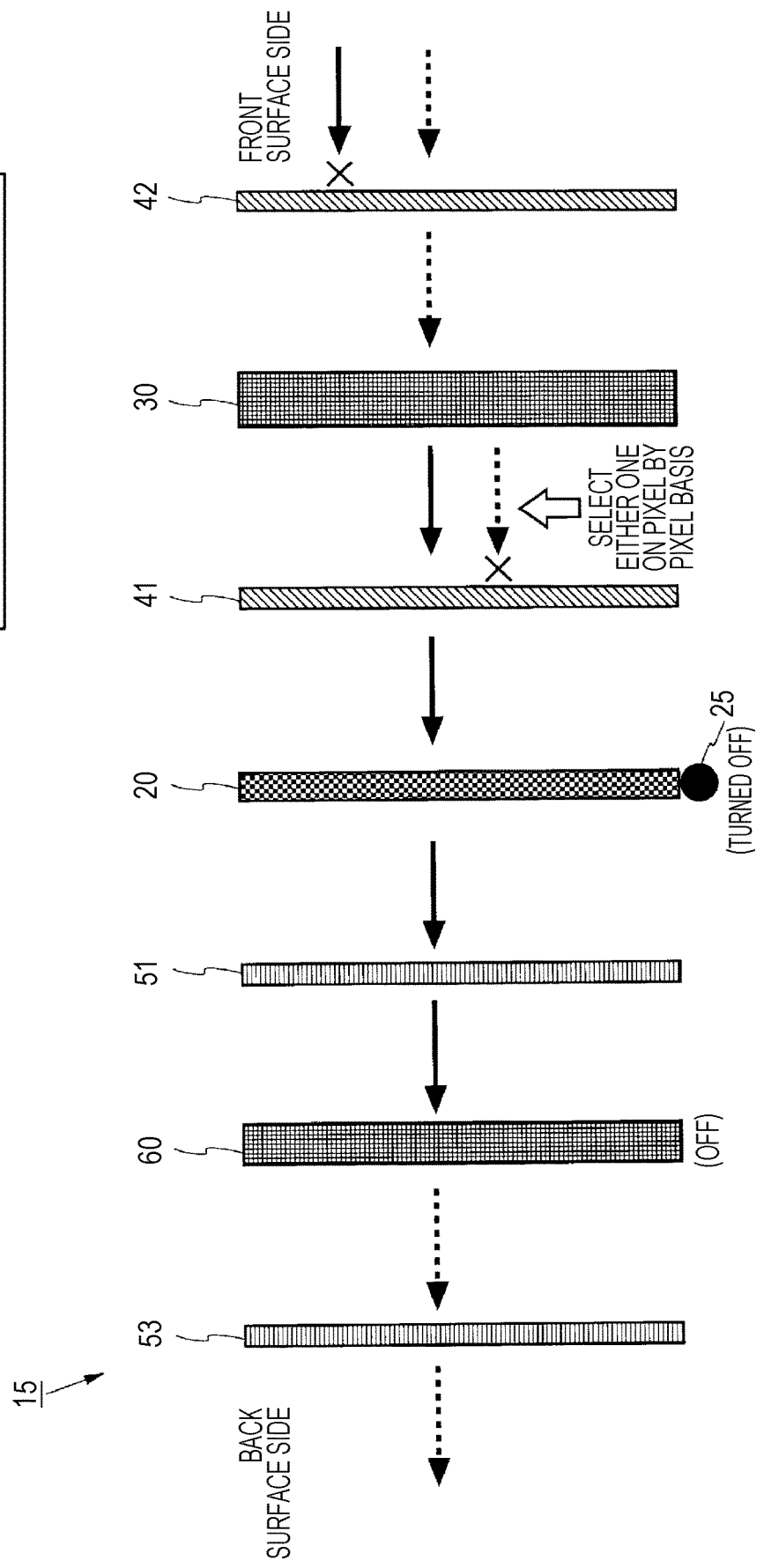
FIG. 11 illustrates light ray trajectories obtained when light incident from the front surface side is transmitted to the back surface side in the display illustrated in FIG. 9.

FIG. 11 illustrates light ray trajectories obtained when light incident from the front surface side is transmitted to the back surface side in the display 15 illustrated in FIG. 9. Similarly to the case illustrated in FIG. 10, in the case illustrated in FIG. 11 as well, the second liquid-crystal panel 60 is in the off state, and the light source 25 is being turned off. The first polarization wave incident from the front surface side is absorbed by the second absorptive polarization plate 42, and the second polarization wave is transmitted through the second absorptive polarization plate 42 and becomes incident on the first liquid-crystal panel 30.

The first polarization wave incident on an on-state pixel in the first liquid-crystal panel 30 is transmitted as-is without being converted and is absorbed by the first absorptive polarization plate 41. Meanwhile, the second polarization wave incident on an off-state pixel is converted to the first polarization wave, is transmitted successively through the first absorptive polarization plate 41, the light guide plate 20, and the first reflective polarization plate 51, and becomes incident on the second liquid-crystal panel 60. Since the second liquid-crystal panel 60 is in the off state, the incident first polarization wave is emitted upon being converted to the second polarization wave and becomes incident on the third reflective polarization plate 53. Since the transmission axis of the third reflective polarization plate 53 is orthogonal to the transmission axis of the first reflective polarization plate 51, the second polarization wave is transmitted through the third reflective polarization plate 53 to exit to the back surface side. As a result, a viewer present at the back surface side can see a state of the front surface side at positions corresponding to the off-state pixels in the first liquid-crystal panel 30 and can see a screen in which black display appears at positions corresponding to the on-state pixels. In this manner, the light ray trajectories illustrated in FIG. 10 and FIG. 11 reveal that the display 15 functions as a see-through display.

In this case, when the front surface side is dim, the quantity of light transmitted from the front surface side to the back surface side is reduced, and thus the display 15, rather than functioning as a see-through display, substantially functions a mirror that reflects, with the third reflective polarization plate 53, the first polarization wave incident from the back surface side.

Figure 12:
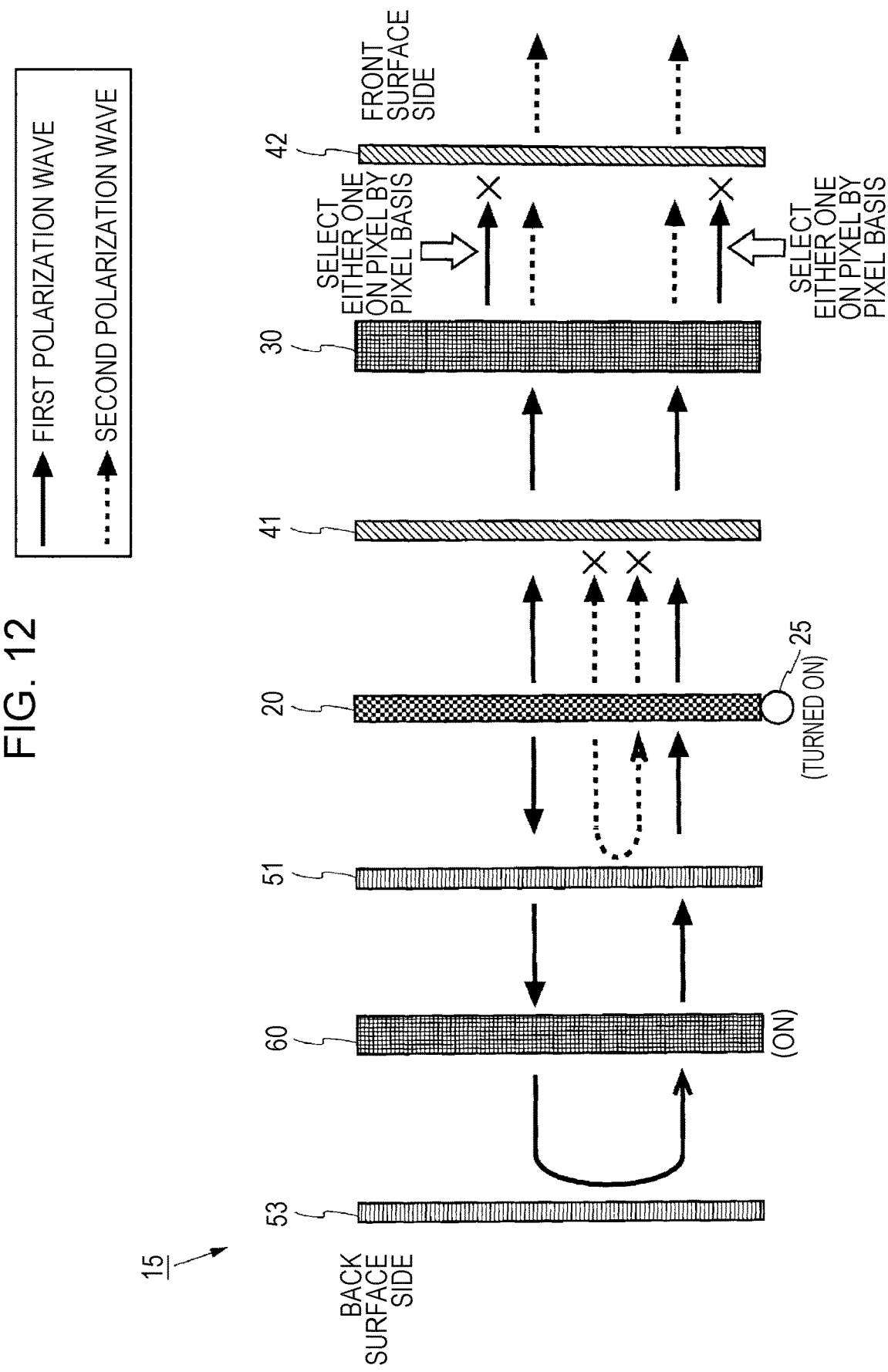
FIG. 12 illustrates light ray trajectories obtained when light emitted from a light guide plate while a light source is being turned on is transmitted to the front surface side in the display illustrated in FIG. 9.

FIG. 12 illustrates light ray trajectories obtained when light emitted from the light guide plate 20 while the light source 25 is being turned on is transmitted to the front surface side in the display 15 illustrated in FIG. 9. In this case, unlike the cases illustrated in FIG. 10 and FIG. 11, the second liquid-crystal panel 60 is in the on state, and the light source 25 is being turned on. As illustrated in FIG. 12, the first polarization wave and the second polarization wave emitted from the light guide plate 20 to the display surface side are incident on the first absorptive polarization plate 41. The first absorptive polarization plate 41, of the incident light, absorbs the second polarization wave and transmits the first polarization wave. The light ray trajectories from a point where the first polarization wave transmitted through the first absorptive polarization plate 41 is incident on the liquid-crystal panel 30 to a point where the light is transmitted to the front surface side are the same as in the case illustrated in FIG. 6, and thus descriptions thereof will be omitted.

The first polarization wave emitted from the light guide plate 20 to the rear surface side, upon being incident on the second liquid-crystal panel 60, becomes incident on the third reflective polarization plate 53 without having the polarization state thereof changed by the second liquid-crystal panel 60. The first polarization wave is reflected to the display surface side by the third reflective polarization plate 53 having a reflection axis orthogonal to the reflection axis of the first reflective polarization plate 51, is transmitted successively through the second liquid-crystal panel 60, the first reflective polarization plate 51, the light guide plate 20, and the first absorptive polarization plate 41, and becomes incident on the first liquid-crystal panel 30. The light ray trajectories to a point where the first polarization wave incident on the first liquid-crystal panel 30 is transmitted to the front surface side are the same as in the case illustrated in FIG. 6, and thus descriptions thereof will be omitted. In addition, the second polarization wave emitted from the light guide plate 20 to the rear surface side is reflected by the first reflective polarization plate 51 to the display surface side. The reflected second polarization wave is transmitted through the light guide plate 20 and becomes incident on the first absorptive polarization plate 41 to be absorbed thereby.

As a result, a viewer present at the front surface side can see a luminous state at positions corresponding to the off-state pixels in the first liquid-crystal panel 30 and can see a screen in which black display appears at positions corresponding to the on-state pixels. In this manner, the display 15 can display a luminous state and black display in combination.

A relationship between the light ray trajectories and the quantities of light in the display 11 used in the first base study and in the display 12 used in the second base study will be examined prior to describing a relationship between the light ray trajectories and the quantities of light in the display 15 according to the present embodiment. In any of the cases, the light source 25 is being turned on, the sum total of the quantities of light emitted from the light guide plate 20 to the display surface side and the rear surface side at that point is "1," and any loss in the quantities of light caused by various members included in each of the displays described above is ignored.

Figure 13:
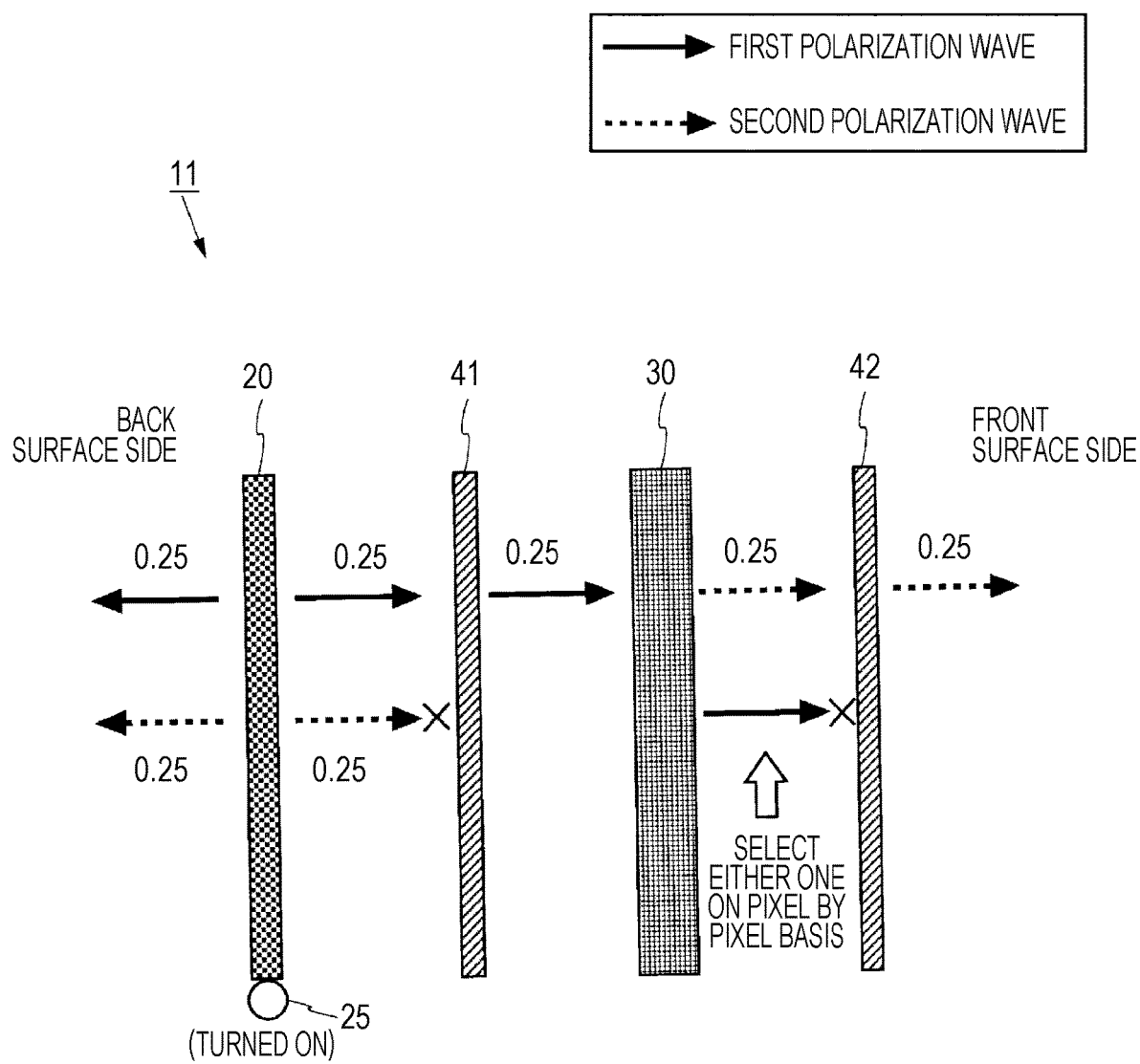
FIG. 13 illustrates light ray trajectories and the quantities of light in the light ray trajectories in the display used in the first base study.

FIG. 13 illustrates the light ray trajectories and the quantities of light in the light ray trajectories in the display 11 used in the first base study. As illustrated in FIG. 13, the proportions of the first and second polarization waves emitted from the light guide plate 20 to the display surface side and the back surface side are each "0.25." In this case, the proportions of the first and second polarization waves transmitted to the back surface side are each "0.25." In addition, the first polarization wave emitted from the light guide plate 20 to the display surface side is converted to the second polarization wave, and the proportion of the second polarization wave transmitted to the front surface side is also "0.25." However, the second polarization wave emitted from the light guide plate 20 to the display surface side is absorbed by the first absorptive polarization plate 41 and cannot be transmitted to the front surface side. As a result, the proportion of the light transmitted to the front surface side is "0.25," and the proportion of the light transmitted to the back surface side is "0.50."

Figure 14:
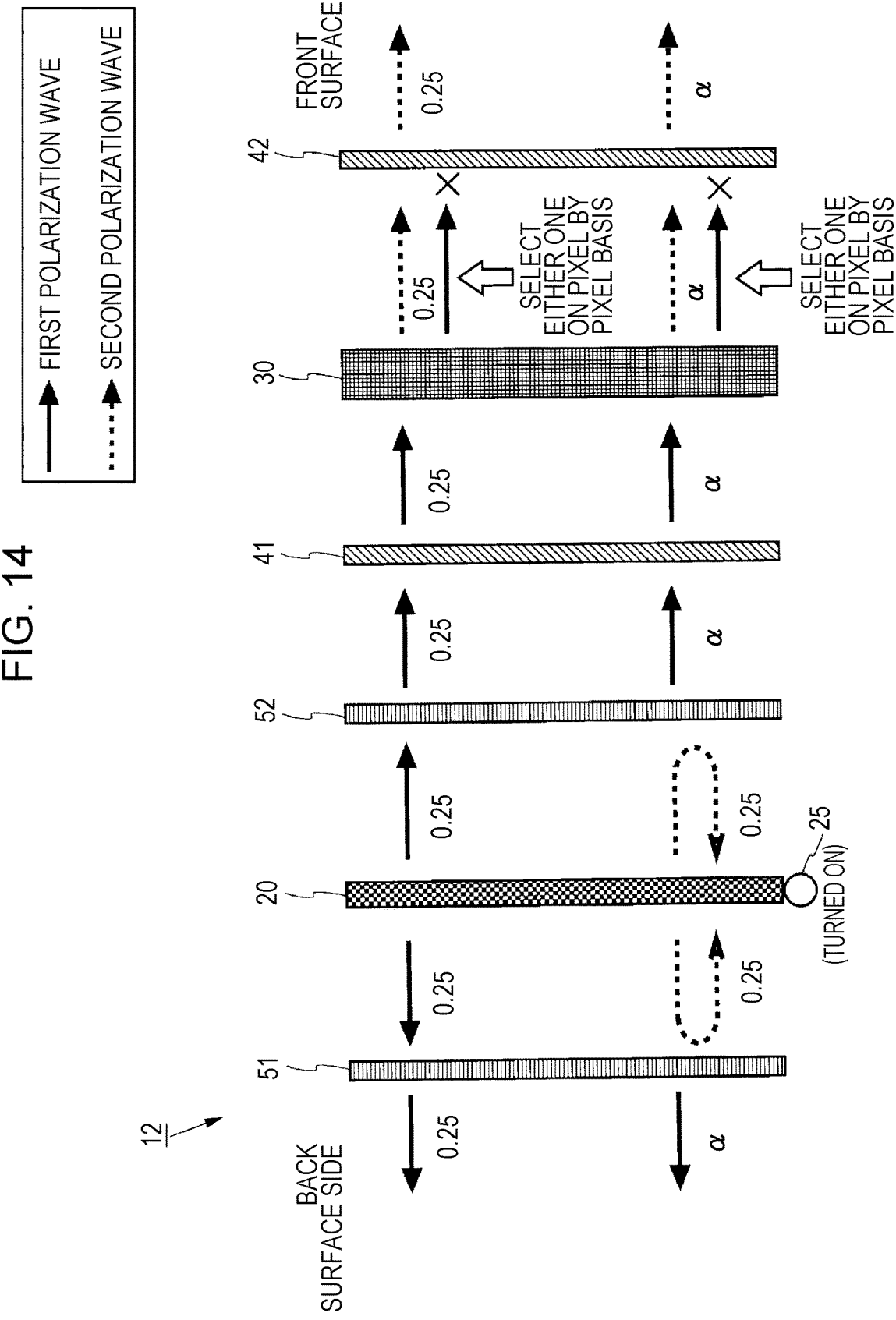
FIG. 14 illustrates light ray trajectories and the quantities of light in the light ray trajectories in the display used in the second base study.

FIG. 14 illustrates the light ray trajectories and the quantities of light in the light ray trajectories in the display 12 used in the second base study. As illustrated in FIG. 14, in the second base study, of the first and second polarization waves emitted from the light guide plate the display surface side and the rear surface side, the proportions of the light transmitted to the front surface side and the back surface side without being reflected by the first and second reflective polarization plates 51 and 52 are each "0.25."

However, unlike the case of the first base study, the second polarization wave emitted from the light guide plate 20 to the rear surface side and the second polarization wave emitted from the light guide plate 20 to the display surface side and reflected by the second reflective polarization plate 52 are incident on the light guide plate 20. The second polarization wave incident on the light guide plate 20 has turbulence produced therein upon passing through the polarization scattering element within the light guide plate 20 and results in a generation of a combined wave that includes the second polarization wave and the first polarization wave. The ratio of the first polarization wave and the second polarization wave included in this combined wave is typically not 1:1. Thus, when the proportion of the first polarization wave included in the combined wave is designated by "α," "α" satisfies the following expression (2) and is "0.25" at a maximum.

$$\alpha \leq 0.25 \quad (2)$$

Therefore, when the second polarization wave emitted from the light guide plate 20 to the rear surface side is reflected by the first reflective polarization plate 51 to the display surface side and becomes incident on the light guide plate 20, a combined wave that including the first polarization wave and the second polarization wave is generated and emitted toward the second reflective polarization plate 52. The second reflective polarization plate 52 transmits the first polarization wave included in the combined wave and reflects the second polarization wave. The second polarization wave reflected by the second reflective polarization plate 52 is incident on the light guide plate 20, and then a combined wave that includes the first polarization wave and the second polarization wave is generated and emitted toward the first reflective polarization plate 51. The first reflective polarization plate 51 transmits the first polarization wave included in the combined wave to the back surface side and reflects the second polarization wave. Thereafter, the second polarization wave is repeatedly reflected between the first reflective polarization plate 51 and the second reflective polarization plate 52 in a similar manner. The second polarization wave emitted from the light guide plate 20 to the display surface side is also repeatedly reflected between the first reflective polarization plate 51 and the second reflective polarization plate 52 in a similar manner.

In this manner, when "α" designates the proportion of the first polarization wave included in the combined wave generated in the light guide plate 20 when the second polarization wave reflected between the first reflective polarization plate 51 and the second reflective polarization plate 52 is incident on the light guide plate 20, the first polarization wave having a proportion of "α" is transmitted to each of the front surface side and the back surface side. As a result, the proportions of the first polarization waves that reach the front surface side and the back surface side are each "0.25+α."

Figure 15:
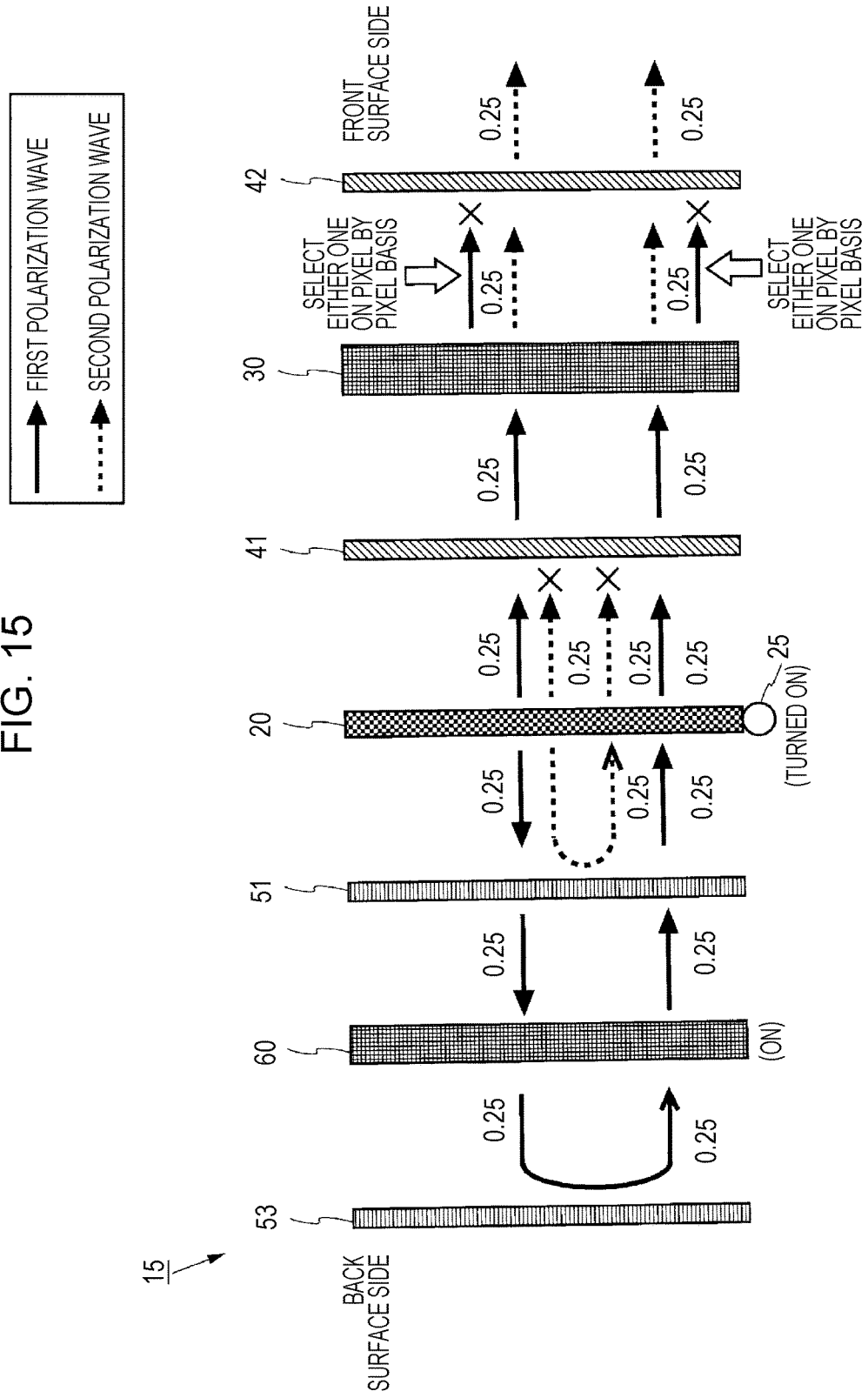
FIG. 15 illustrates a relationship between the light ray trajectories and the quantities of light in the display according to the first embodiment.

FIG. 15 illustrates a relationship between the light ray trajectories and the quantities of light in the display 15 according to the present embodiment. As illustrated in FIG. 15, the proportions of the first and second polarization waves emitted from the light guide plate 20 to the display surface side and the rear surface side are each "0.25," and the second liquid-crystal panel 60 is in the on state.

The first polarization wave emitted from the light guide plate 20 to the rear surface side and having a proportion of "0.25" is transmitted through the first reflective polarization plate 51 and the second liquid-crystal panel 60 and reflected by the third reflective polarization plate 53 to the front surface side. The reflected first polarization wave is transmitted successively through the second liquid-crystal panel 60, the first reflective polarization plate 51, the light guide plate 20, and the first absorptive polarization plate 41 and becomes incident on the first liquid-crystal panel 30 as the first polarization wave having a proportion of "0.25." The first polarization wave incident on the first liquid-crystal panel 30 is emitted upon being converted to the second polarization wave having a proportion of "0.25" if incident on an off-state pixel or emitted as-is as the first polarization wave having a proportion of "0.25" if incident on an on-state pixel. Of the above, only the second polarization wave having a proportion of "0.25" is transmitted through the second absorptive polarization plate 42 to exit to the front surface side. Meanwhile, the second polarization wave emitted from the light guide plate 20 to the rear surface side and having a proportion of "0.25" is reflected by the first reflective polarization plate 51 to the display surface side, is transmitted through the light guide plate 20, and becomes incident on the first absorptive polarization plate 41 to be absorbed thereby. Therefore, the second polarization wave emitted from the light guide plate 20 to the rear surface side can be transmitted to neither the back surface side nor the front surface side.

The results described above reveal the following. Transmitted to the front surface side are only the second polarization wave converted from the first polarization wave emitted from the light guide plate 20 to the display surface side and having a proportion of "0.25" and the second polarization wave converted from the first polarization wave emitted from the light guide plate 20 to the rear surface side and having a proportion of "0.25," and the proportion of the two is "0.5." Meanwhile, the proportions of the first and second polarization waves transmitted to the back surface side are both "0."

FIG. 16 illustrates advantageous effects of the present embodiment in comparison to the cases of the first and second base studies. The quantity of light transmitted to the front surface side in the present embodiment is increased by two times as compared to that in the case of the first base study, and thus the screen becomes brighter. In addition, since, the quantity of light transmitted to the back surface side can be made "0," glare experienced when a viewer sees the display 15 from the back surface side can be reduced, and any stress experienced by the viewer can be reduced. In the second base study, the quantity of light transmitted to the front surface side is "0.25+α," and as the value of "α" increases, the quantity of light transmitted to the front surface side increases to the level comparable to that in the case of the present embodiment; thus, the screen becomes brighter. However, as the value of "α" increases, so does the turbidity of the light guide plate 20, which in turn makes the background look more blurry when the background side is seen from the front surface side, as illustrated in FIG. 7(A). In contrast, in the present embodiment, a viewer can see the background displayed clearly even when the screen is made brighter.

<2.4 Advantageous Effects>

According to the present embodiment, the first polarization wave emitted from the light guide plate 20 to the display surface side is transmitted through the first and second absorptive polarization plates 41 and 42 to be transmitted to the front surface side as the second polarization wave. Furthermore, the first polarization wave emitted from the light guide plate 20 to the rear surface side is also reflected to the front surface side by the third reflective polarization plate 53 provided at the back surface and transmitted to the front surface side. Thus, the proportion of the second polarization wave transmitted to the front surface side becomes as very high as "0.5." Accordingly, the utilization efficiency of the light emitted from the light guide plate 20 improves, and the screen can be made brighter.

In addition, the second polarization wave emitted from the light guide plate 20 to the back surface side is reflected by the first reflective polarization plate 51 to the front surface side and absorbed by the first absorptive polarization plate 41. Accordingly, the quantity of light transmitted to the back surface side can be made "0," and thus a viewer present at the back surface side does not experience stress associated with glare.

Furthermore, the turbidity of the light guide plate 20 of the display 15 is low, and thus a viewer present at the front surface side and a viewer present at the back surface side can clearly see the state of the back surface side and the state of the front surface side, respectively.

3. Second Embodiment

A configuration and an operation of a liquid-crystal display device 110 according to the present embodiment are the same as in the case of the first embodiment illustrated in FIG. 8, and thus the drawing illustrating the configuration and descriptions thereof will be omitted. FIG. 17 is a sectional view illustrating a configuration of a display 16 included in the liquid-crystal display device 110 according to the present embodiment. As illustrated in FIG. 17, the display 16 has a configuration in which a third absorptive polarization plate 43 is further disposed at the rear surface of the display 15 illustrated in FIG. 9, and other configurations are identical to those of the display 15; thus, descriptions thereof will be omitted. The transmission axis of the third absorptive polarization plate 43 is in the same direction as the transmission axis of a third reflective polarization plate 53 and orthogonal to the transmission axes of a first reflective polarization plate 51 and a first absorptive polarization plate 41.

<3.1 Light Ray Trajectory>

Figure 19:
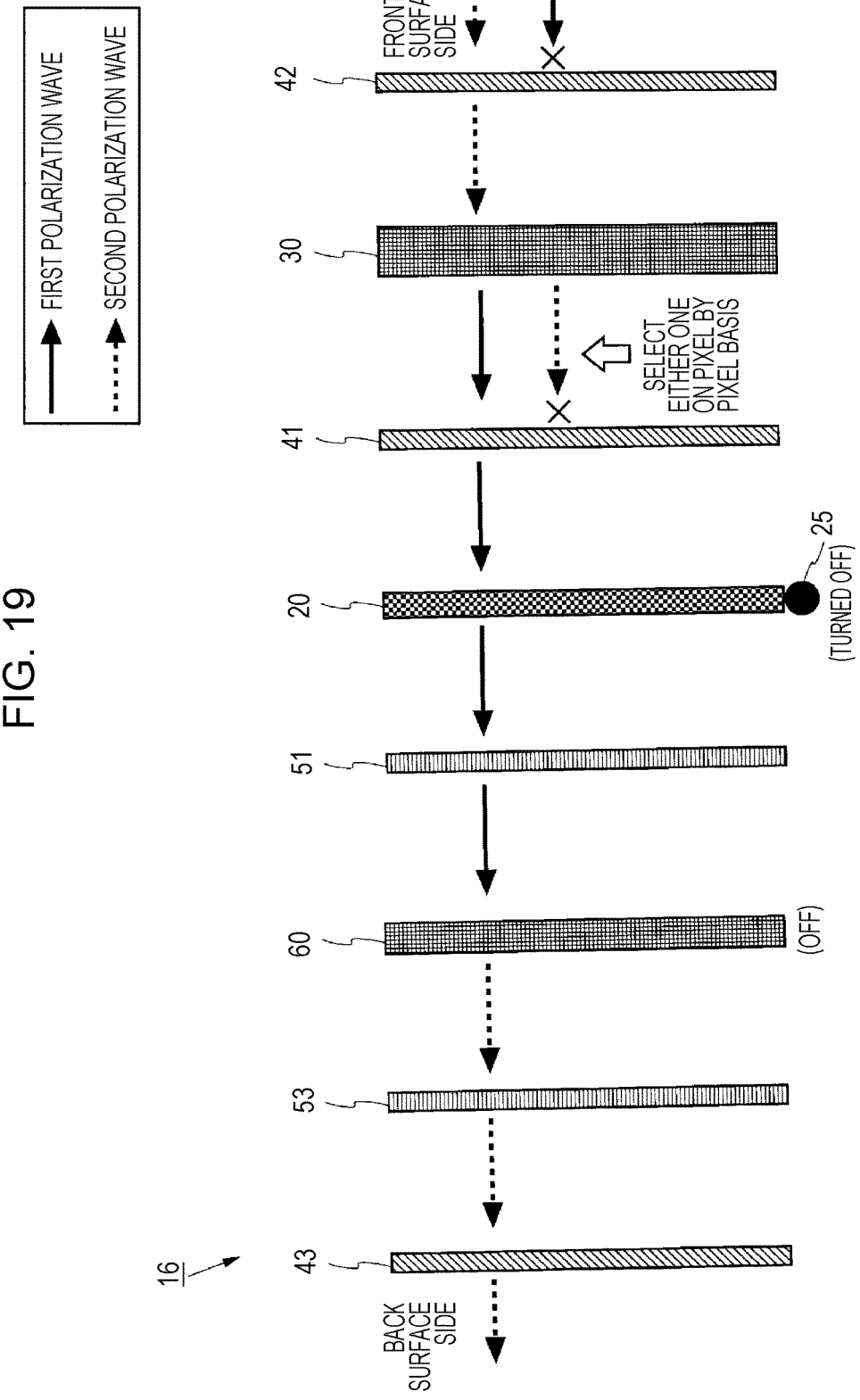
FIG. 19 illustrates light ray trajectories obtained when light incident from the front surface side is transmitted to the back surface side in the display illustrated in FIG. 17.
Figure 20:
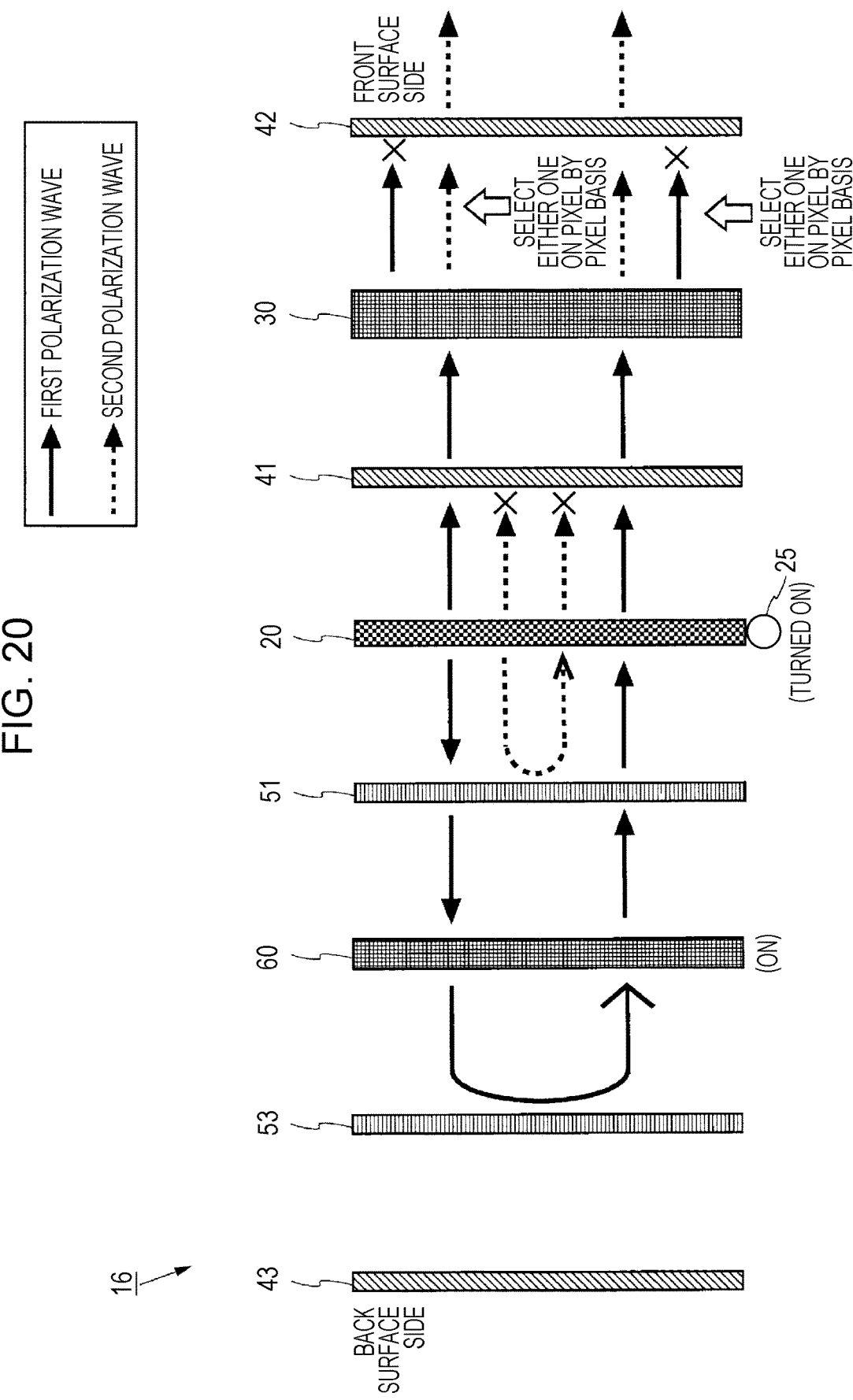
FIG. 20 illustrates light ray trajectories obtained when light emitted from a light guide plate while a light source is being turned on is transmitted to the front surface side and the back surface side in the display illustrated in FIG. 17.

FIG. 18 illustrates light ray trajectories obtained when light incident from a back surface side is transmitted to a front surface side in the display 16 according to the present embodiment. FIG. 19 illustrates light ray trajectories obtained when light incident from the front surface side is transmitted to the back surface side in the display 16 according to the present embodiment. FIG. 20 illustrates light ray trajectories obtained when light emitted from a light guide plate 20 while a light source 25 is being turned on is transmitted to the front surface side and the back surface side in the display 16. In FIG. 18 and FIG. 19, a second liquid-crystal panel 60 is in an off state, and the light source 25 is being turned off. In FIG. 20, the second liquid-crystal panel 60 is in an on state, and the light source 25 is being turned on.

In any of the cases, the light ray trajectories of the first and second polarization waves incident from the back surface side, the first and second polarization waves incident from the front surface side, and the first and second polarization waves emitted from the light guide plate 20 are the same as in the cases illustrated in FIG. 10, FIG. 11, and FIG. 12, respectively, and thus descriptions thereof will be omitted. In the present embodiment, as illustrated in FIG. 18, the second polarization wave incident on the third absorptive polarization plate 43 from the back surface side is transmitted through the third reflective polarization plate 53, but the first polarization wave is absorbed by the third absorptive polarization plate 43.

<3.2 Advantageous Effects>

According to the present embodiment, similarly to the case of the first embodiment, the utilization efficiency of the light emitted from the light guide plate 20 can be improved, and the screen can thus be made brighter. In addition, the quantity of light transmitted to the back surface side can be made "0," and thus a viewer present at the back surface side does not experience stress associated with glare.

Furthermore, since the third absorptive polarization plate 43 is disposed at the rear surface of the display 16, of the light incident on the third absorptive polarization plate 43 from the back surface side, the second polarization wave is transmitted through the third absorptive polarization plate 43, and the first polarization wave is absorbed by the third absorptive polarization plate 43. Therefore, when a viewer present at the back surface side sees the front surface side through the display 16, even if the brightness of the front surface side is low, the rear surface of the display 16 does not enter a mirror state, and thus an object placed at the front surface side can be seen with ease. In addition, since the rear surface of the display 16 does not enter a mirror state, the display 16 can be used to keep any object placed at the back surface side from being displayed on the rear surface of the display.

4. Third Embodiment

Figure 21:
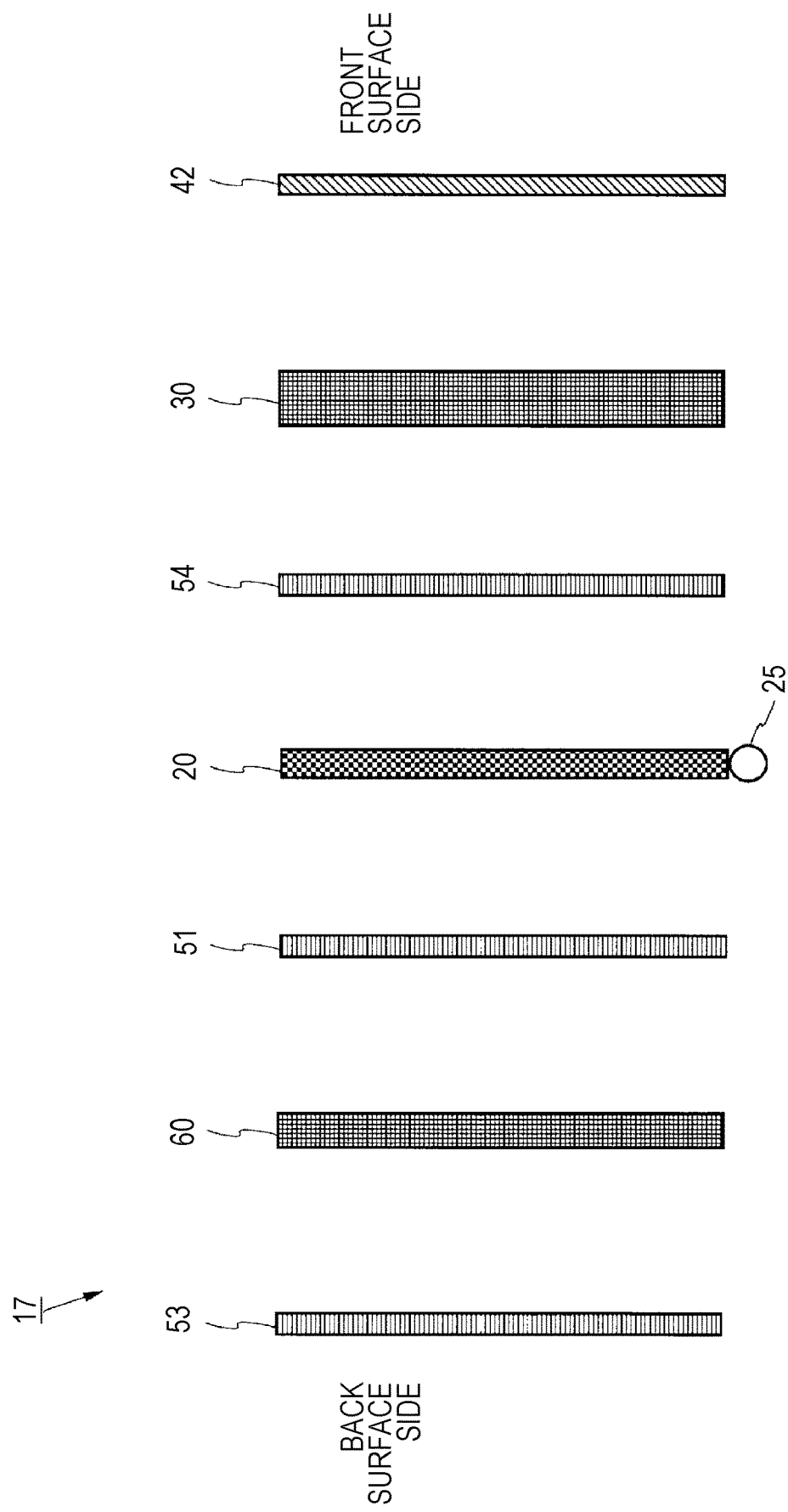
FIG. 21 is a sectional view illustrating a configuration of a display included in a liquid-crystal display device according to a third embodiment.

A configuration and an operation of a liquid-crystal display device 110 according to the present embodiment are the same as in the case of the first embodiment illustrated in FIG. 8, and thus the drawing illustrating the configuration and descriptions thereof will be omitted. FIG. 21 is a sectional view illustrating a configuration of a display 17 included in the liquid-crystal display device 110 according to the present embodiment. As illustrated in FIG. 21, in the display 17, a fourth reflective polarization plate 54 is disposed in place of the first absorptive polarization plate 41 of the display 15 illustrated in FIG. 9, and thus a light guide plate 20 is sandwiched by a first reflective polarization plate 51 and the fourth reflective polarization plate 54. Other configurations of the display 17 are identical to those of the display 15, and thus descriptions thereof will be omitted. The reflection axis of the fourth reflective polarization plate 54 is in the same direction as the reflection axis of the first reflective polarization plate 51, and they both reflect the second polarization wave and transmit the first polarization wave.

<4.1 Light Ray Trajectory>

Figure 22:
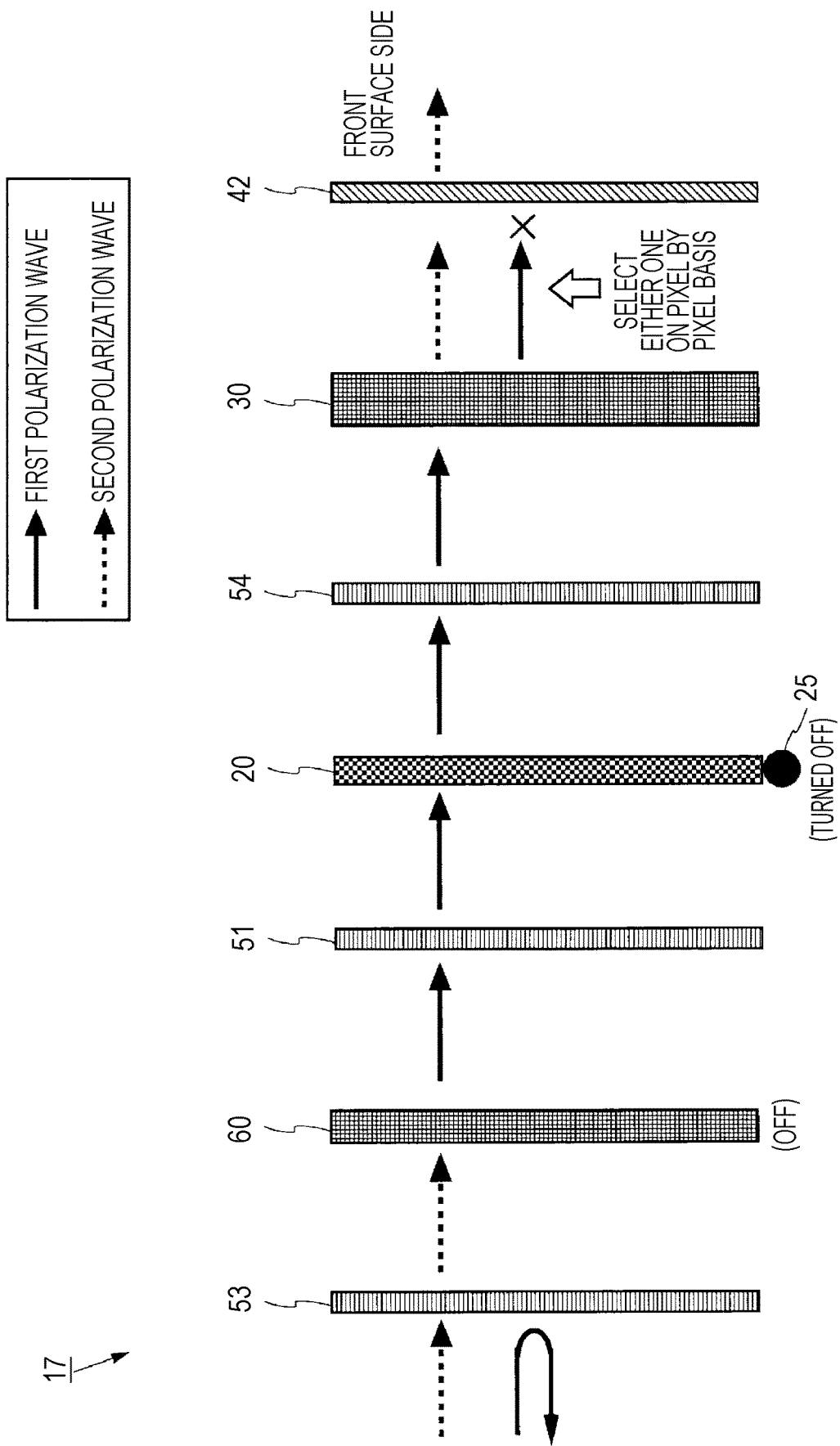
FIG. 22 illustrates light ray trajectories obtained when light incident from a back surface side is transmitted to a front surface side in the display illustrated in FIG. 21.
Figure 23:
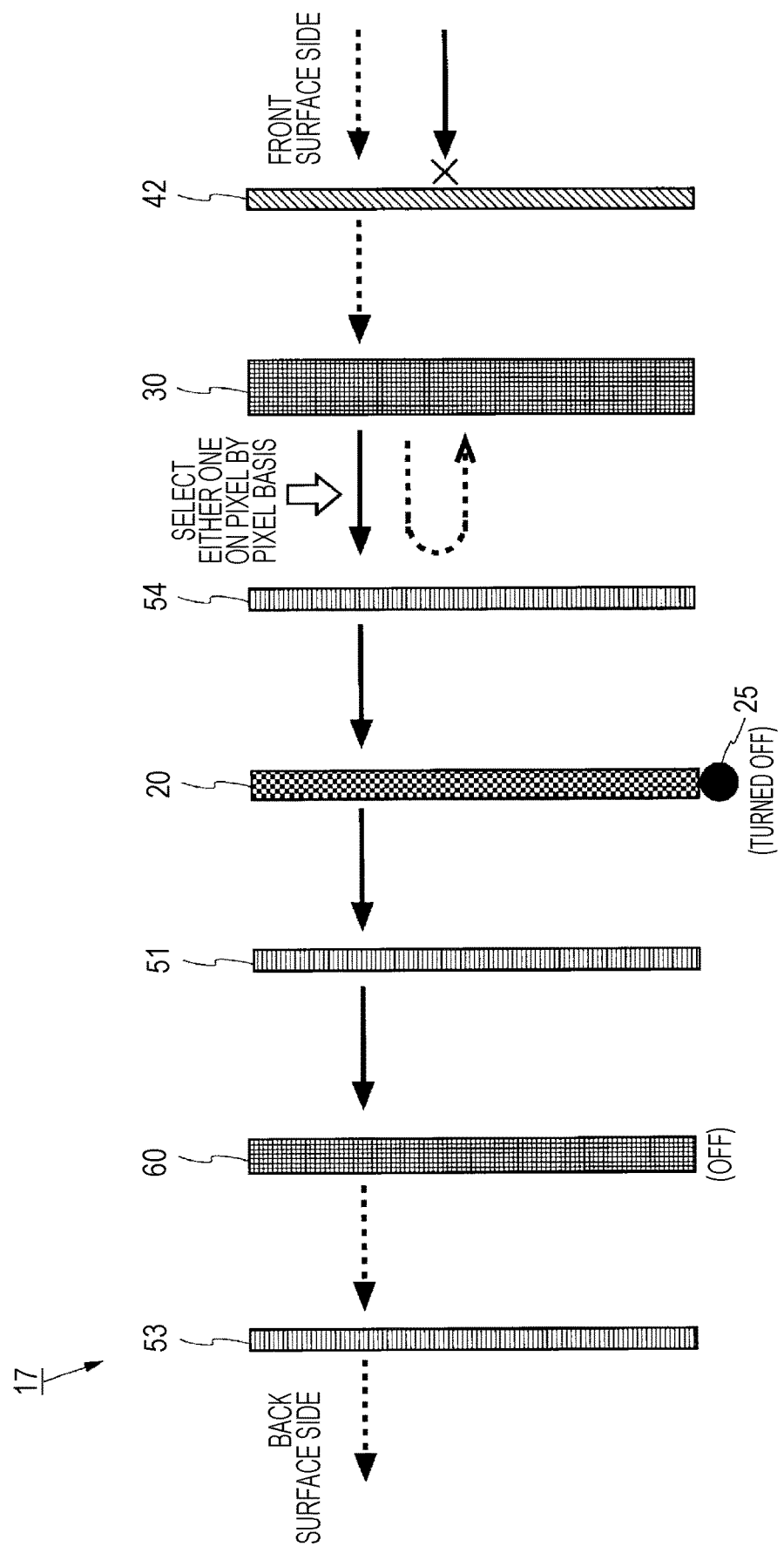
FIG. 23 illustrates light ray trajectories obtained when light incident from the front surface side is transmitted to the back surface side in the display illustrated in FIG. 21.
Figure 24:
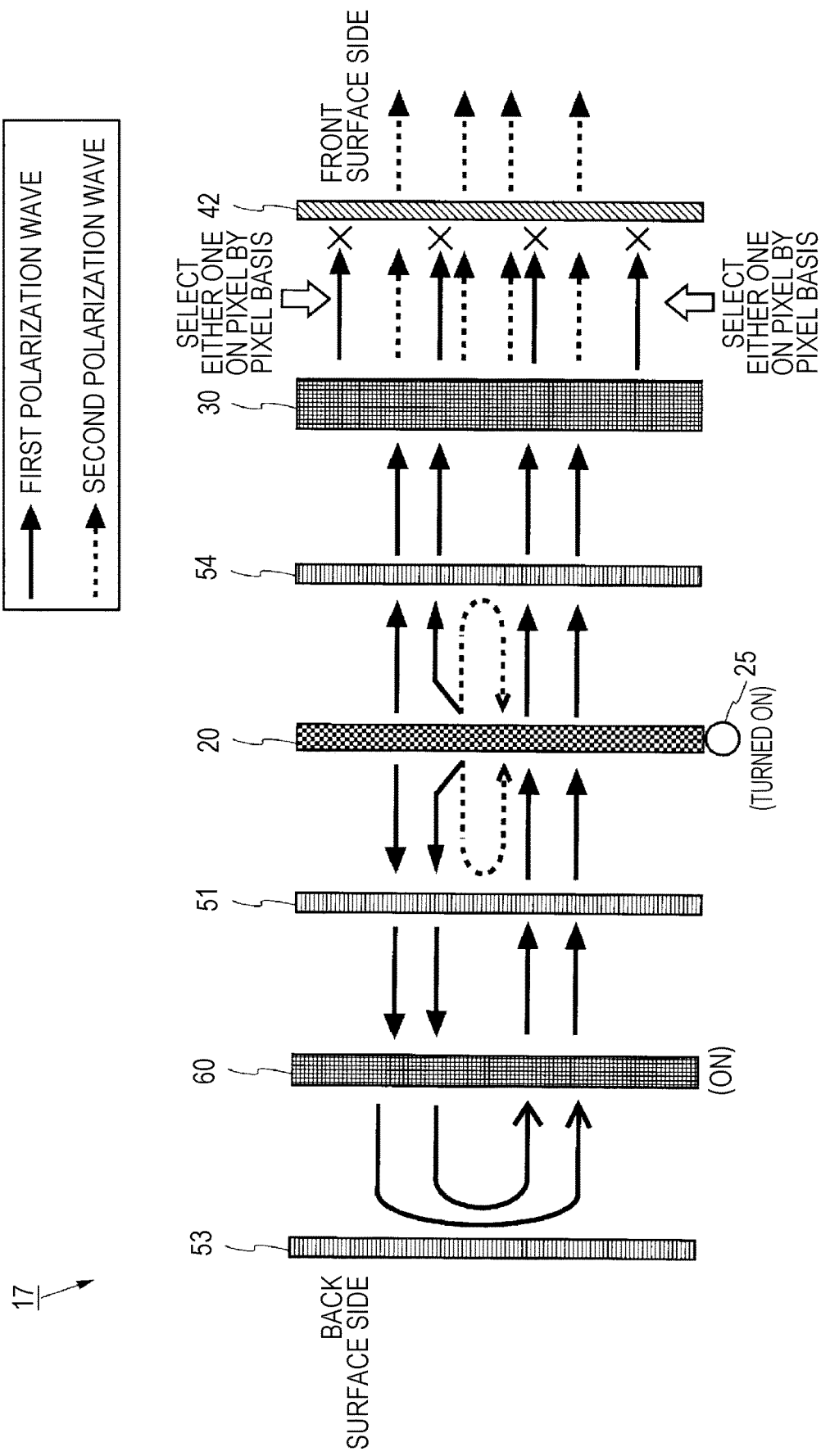
FIG. 24 illustrates light ray trajectories obtained when light emitted from a light guide plate while a light source is being turned on is transmitted to the front surface side in the display illustrated in FIG. 21.

FIG. 22 illustrates light ray trajectories obtained when light incident from a back surface side is transmitted to a front surface side in the display 17 according to the present embodiment. FIG. 23 illustrates light ray trajectories obtained when light incident from the front surface side is transmitted to the back surface side in the display 17 according to the present embodiment. FIG. 24 illustrates light ray trajectories obtained when light emitted from the light guide plate 20 while a light source 25 is being turned on is transmitted to the front surface side in the display 17. In FIG. 22 and FIG. 23, a second liquid-crystal panel 60 is in an off state, and the light source 25 is being turned off. In FIG. 24, the second liquid crystal panel 60 is in an on state, and the light source 25 is being turned on.

As illustrated in FIG. 22, the second polarization wave incident from the back surface side is transmitted through a third reflective polarization plate 53 and becomes incident on the second liquid-crystal panel 60. Since the second liquid-crystal panel 60 is in the off state, the first polarization wave is converted to the second polarization wave, is transmitted successively through the first reflective polarization plate 51 and the light guide plate 20, and becomes incident on the fourth reflective polarization plate 54. Since the fourth reflective polarization plate 54 transmits the first polarization wave, the first polarization wave transmitted through the fourth reflective polarization plate 54 is transmitted to the front surface side, as described in relation to FIG. 10. Meanwhile, the first polarization wave incident on the third reflective polarization plate 53 from the back surface side is reflected by the third reflective polarization plate 53.

As illustrated in FIG. 23, the second polarization wave incident from the front surface side is transmitted through the second absorptive polarization plate 42 and becomes incident on a first liquid-crystal panel 30. The second polarization wave incident on an off-state pixel in the first liquid-crystal panel 30 is converted to the first polarization wave, and the second polarization wave incident on an on-state pixel is emitted toward the fourth reflective polarization plate 54 as-is as the second polarization wave. The first polarization wave is transmitted through the fourth reflective polarization plate 54, and the second polarization wave is reflected by the fourth reflective polarization plate 54. The first polarization wave transmitted through the fourth reflective polarization plate 54 is transmitted successively through the light guide plate 20 and the first reflective polarization plate 51 and becomes incident on the second liquid-crystal panel 60. Since the second liquid-crystal panel 60 is in the off state, the first polarization wave is converted to the second polarization wave and transmitted through the third reflective polarization plate 53 to exit to the back surface side. Meanwhile, the first polarization wave incident on the second absorptive polarization plate 42 from the front surface side is absorbed by the second absorptive polarization plate 42.

As illustrated in FIG. 24, the light ray paths of the first polarization waves emitted from the light guide plate 20 to the display surface side and the rear surface side are the same as in the case of the first embodiment illustrated in FIG. 12, and thus descriptions thereof will be omitted. The second polarization wave emitted from the light guide plate 20 to the display surface side is reflected by the fourth reflective polarization plate 54 to the rear surface side, is transmitted through the light guide plate 20, and becomes incident on the first reflective polarization plate 51. The second polarization wave incident on the first reflective polarization plate 51 is reflected by the first reflective polarization plate 51 to the front surface side. Thereafter, the second polarization wave is repeatedly reflected between the fourth reflective polarization plate 54 and the first reflective polarization plate 51 in a similar manner. The second polarization wave emitted from the light guide plate 20 to the rear surface side is also repeatedly reflected between the fourth reflective polarization plate 54 and the first reflective polarization plate 51 in a similar manner.

The second polarization wave passes through the light guide plate 20 each time the second polarization wave is reflected between the fourth reflective polarization plate 54 and the first reflective polarization plate 51. In this case, as the second polarization wave passes, for example, through a polarization scattering element, such as a dot pattern or a diffusing agent included within the light guide plate 20, provided in the light guide plate 20 to serve as a light extracting unit, turbulence is produced in the second polarization wave, and a combined wave that includes the second polarization wave and the first polarization wave is generated. The first polarization wave included in the combined wave generated in this manner is transmitted through the fourth reflective polarization plate 54 or the first reflective polarization plate 51, converted to the second polarization wave in a similar manner to the first polarization wave emitted from the light guide plate 20 described above, and transmitted to the front surface side or the back surface side. In this manner, the second polarization wave additionally transmitted to the front surface side contributes to the brightness of the screen as seen from the front surface side, and the screen becomes even brighter.

In this manner, the proportion "α" of the first polarization wave included in the combined wave generated as the second polarization wave incident on the light guide plate 20 passes through the polarization scattering element within the light guide plate 20 is expressed by the following expression (3) and is "0.5" at a maximum.

$$\alpha \leq 0.5 \quad (3)$$

Therefore, in the present embodiment, the proportion of the second polarization wave transmitted to the front surface side is "0.5+α," which is the sum of the proportion "0.5" of the second polarization wave changed from the first polarization wave emitted from the light guide plate 20 to the front surface side and the proportion "α" of the second polarization wave generated as the second polarization wave emitted from the light guide plate 20 passes through the polarization scattering element. Since "α" is "0.5" at a maximum, the proportion of the second polarization wave transmitted to the front surface side is "1" at a maximum. This indicates that light in the quantity that is the same as the quantity of the light emitted from the light guide plate 20 is transmitted to the front surface side.

The value of "α" that expresses the proportion contributing to the brightness of the screen is determined by to what extent the polarization scattering element is present between the first reflective polarization plate 51 and the fourth reflective polarization plate 54. As the value of "α" increases, the second polarization wave scattered by the polarization scattering element increases, and the quantity of light that reaches the front surface side increases to make the screen brighter, but the image is blurred due to the increased turbidity of the light guide plate 20. Therefore, it is preferable that the value of "α" be large but not too large to make the turbidity of the light guide plate 20 excessively high.

FIG. 25 illustrates advantageous effects of the present embodiment in comparison to the cases of the first and second base studies. As illustrated in FIG. 25, the quantity of light transmitted to the front surface side is increased by 2 times plus α in the present embodiment as compared to the case of the first base study; thus, the light utilization efficiency can be improved, and the screen can be made brighter. In addition, the quantity of light transmitted to the front surface side in the present embodiment is greater than that in the case of the second base study, and thus the light utilization efficiency can be improved, and the screen can be made brighter as compared to the second base study as well.

<4.2 Advantageous Effects>

According to the present embodiment, since the light guide plate 20 is sandwiched by the two reflective polarization plates 51 and 54, the second polarization waves emitted from the light guide plate 20 to the display surface side and the rear surface side are also reflected between these reflective polarization plates 51 and 54. As the second polarization wave passes through the polarization scattering element in the light guide plate 20, the first polarization wave is generated. The generated first polarization wave is also converted to the second polarization wave upon being transmitted through an off-state pixel in the first liquid-crystal panel 30 and transmitted to the front surface side. Thus, the quantity of light transmitted to the front surface side can be further increased. As a result, the light utilization efficiency can be further improved, and the screen seen by a viewer from the front surface side can be made even brighter. In addition, since the light cannot be transmitted to the back surface side, a viewer does not experience glare when seeing the back surface of the display 17 and does not experience stress.

5. Fourth Embodiment

A configuration and an operation of a liquid-crystal display device 110 according to the present embodiment are the same as in the case of the first embodiment illustrated in FIG. 8, and thus the drawing illustrating the configuration and descriptions thereof will be omitted. FIG. 26 is a sectional view illustrating a configuration of a display 18 included in the liquid-crystal display device 110 according to the present embodiment. As illustrated in FIG. 26, in the display 18, the first reflective polarization plate 51 and the first absorptive polarization plate 41 disposed to sandwich the light guide plate 20 are removed from the display 15 illustrated in FIG. 9. In addition, a polarization element 26 that transmits the first polarization wave and absorbs the second polarization wave is disposed between a light source 25 and a light guide plate 20. Therefore, the second polarization wave is removed from the light emitted from the light source 25 by the polarization element 26, and thus the light emitted from the light guide plate 20 to the front surface side and the back surface side includes only the first polarization wave.

<5.1 Light Ray Trajectory>

Figure 27:
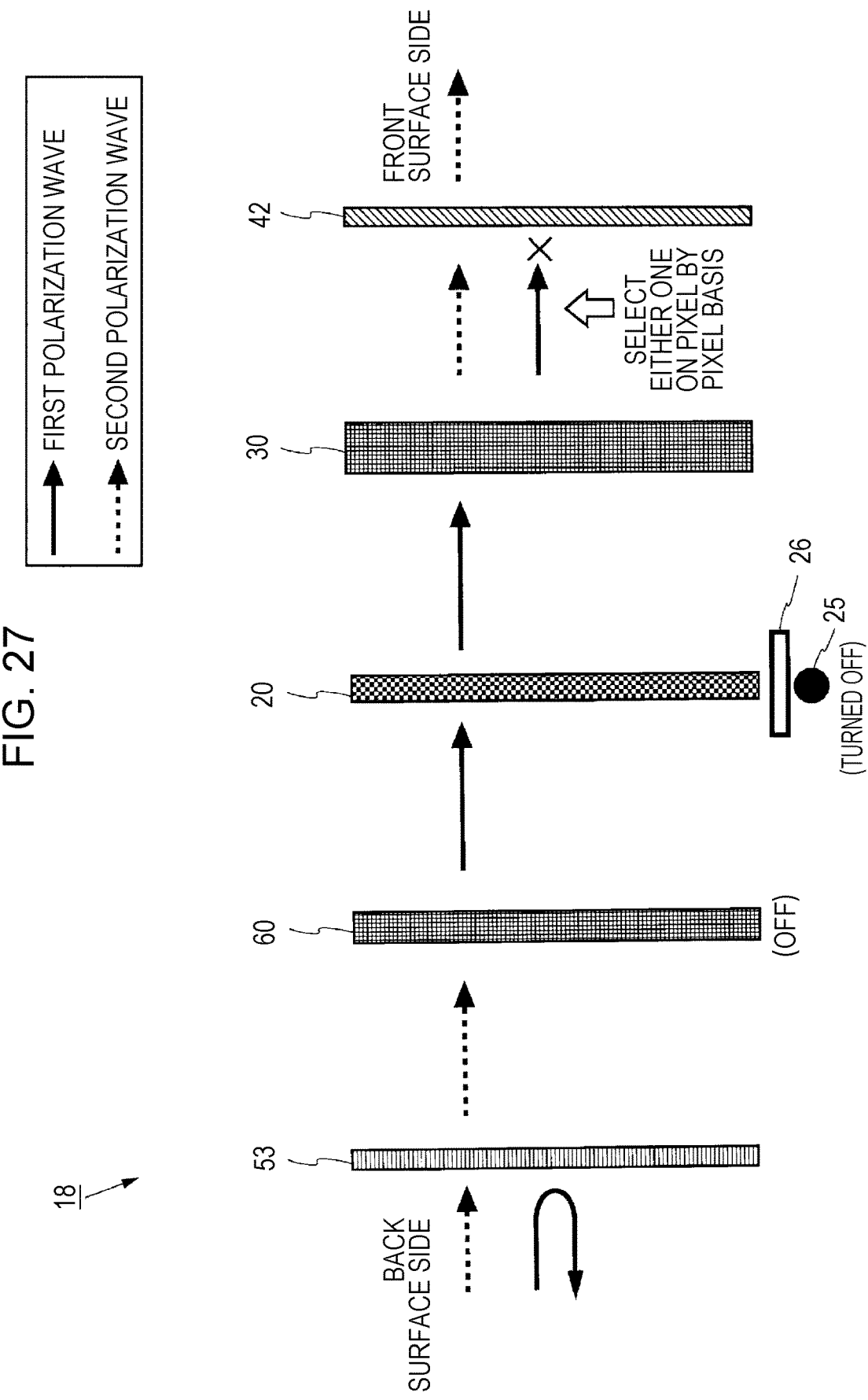
FIG. 27 illustrates light ray trajectories obtained when light incident from a back surface side is transmitted to a front surface side in the display illustrated in FIG. 26.
Figure 28:
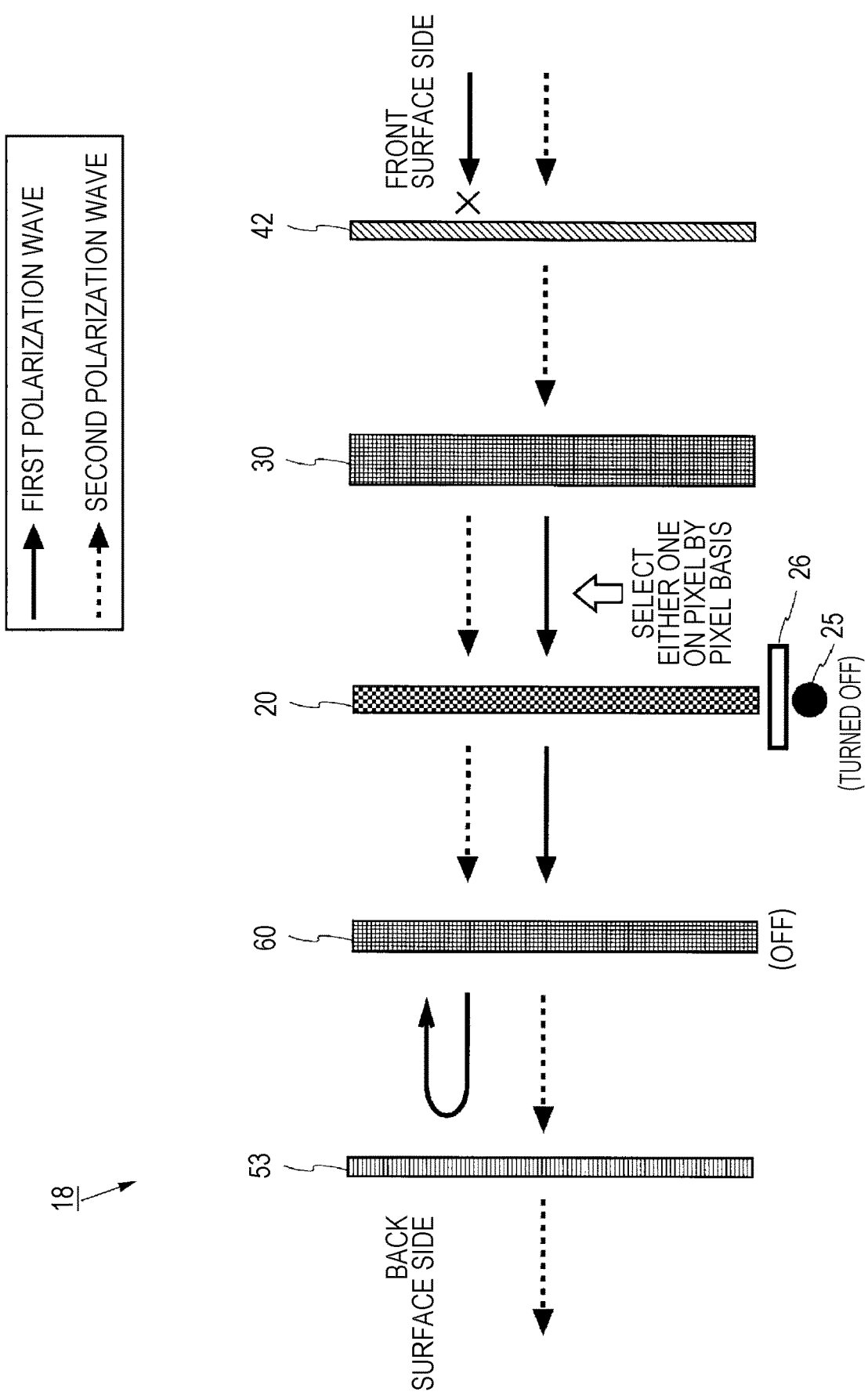
FIG. 28 illustrates light ray trajectories obtained when light incident from the front surface side is transmitted to the back surface side in the display illustrated in FIG. 26.
Figure 29:
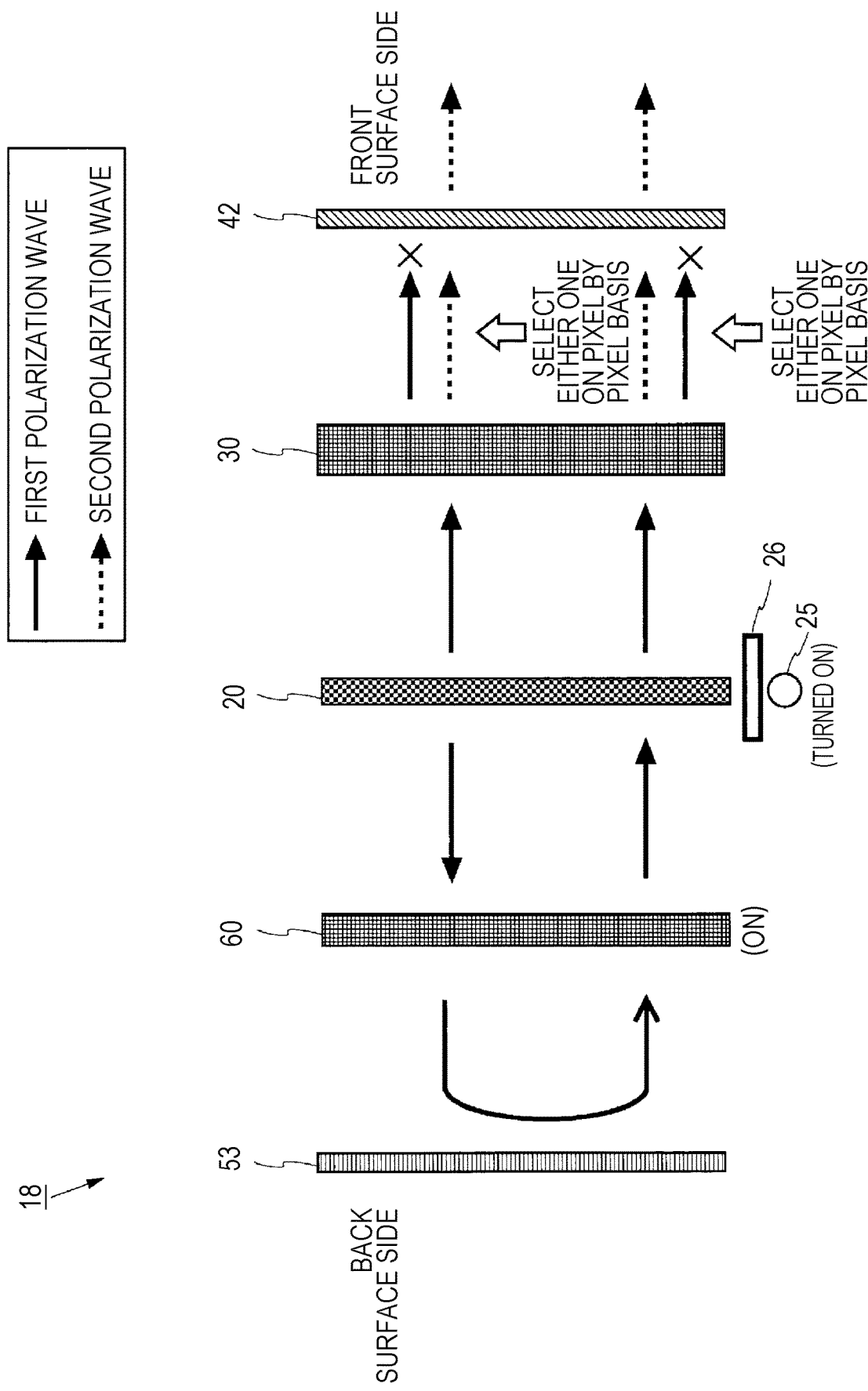
FIG. 29 illustrates light ray trajectories obtained when light emitted from a light guide plate while a light source is being turned on is transmitted to the front surface side in the display illustrated in FIG. 26.

FIG. 27 illustrates light ray trajectories obtained when light incident from a back surface side is transmitted to a front surface side in the display 18 according to the present embodiment. FIG. 28 illustrates light ray trajectories obtained when light incident from the front surface side is transmitted to the back surface side in the display 18 according to the present embodiment. FIG. 29 illustrates light ray trajectories obtained when light emitted from the light guide plate 20 while the light source 25 is being turned on is transmitted to the front surface side in the display 18 according to the present embodiment. In FIG. 27 and FIG. 28, a second liquid-crystal panel 60 is in an off state, and the light source 25 is being turned off. In FIG. 29, the second liquid-crystal panel 60 is in an on state, and the light source 25 is being turned on.

As illustrated in FIG. 27, the first polarization wave incident from the back surface side is reflected by a third reflective polarization plate 53. Meanwhile, the second polarization wave is transmitted through the third reflective polarization plate 53 and becomes incident on the second liquid-crystal panel 60. Since the second liquid-crystal panel 60 is in the off state, the second polarization wave is emitted upon being converted to the first polarization wave. The first polarization wave is transmitted through the light guide plate 20 and becomes incident on a first liquid-crystal panel 30. The first polarization wave incident on an off-state pixel in the liquid-crystal panel 30 is emitted upon being converted to the second polarization wave and transmitted through a second absorptive polarization plate 42 to exit to the front surface side. Meanwhile, the first polarization wave incident on an on-state pixel in the first liquid-crystal panel 30 is emitted as-is as the first polarization wave and absorbed by the second absorptive polarization plate 42. Thus, a viewer present at the front surface side can see the back surface side through the display 18.

As illustrated in FIG. 28, the first polarization wave incident from the front surface side is absorbed by the second absorptive polarization plate 42. Meanwhile, the second polarization wave is transmitted through the second absorptive polarization plate 42 and becomes incident on the first liquid-crystal panel 30. The second polarization wave incident on an off-state pixel in the first liquid-crystal panel 30 is emitted upon being converted to the first polarization wave, and the second polarization wave incident on an on-state pixel in the first liquid-crystal panel 30 is emitted as-is as the second polarization wave. The first and second polarization waves emitted in this manner are transmitted through the light guide plate 20 and become incident on the second liquid-crystal panel 60. Since the second liquid-crystal panel is in the off state, the first polarization wave is converted to the second polarization wave, the second polarization wave is converted to the first polarization wave, and they are emitted toward the third reflective polarization plate 53. The third reflective polarization plate 53 reflects the first polarization wave and transmits the second polarization wave, and thus only the second polarization wave is transmitted to the back surface side. Thus, a viewer present at the back surface side can see the front surface side through the display 18.

As illustrated in FIG. 29, of the first and the second polarization waves included in the light emitted from the light source 25, the second polarization wave is removed by the polarization element 26, and thus only the first polarization wave is incident on the light guide plate 20. Of the first polarization wave emitted from the light guide plate 20 to the display surface side, the first polarization wave incident on an on-state pixel in the first liquid-crystal panel 30 is emitted as-is as the first polarization wave and absorbed by the second absorptive polarization plate 42, and thus this first polarization wave is not transmitted to the front surface side. Meanwhile, the first polarization wave incident on an off-state pixel in the liquid-crystal panel 30 is emitted upon being converted to the second polarization wave and transmitted through the second absorptive polarization plate 42 to exit to the front surface side.

The first polarization wave emitted from the light guide plate 20 to the rear surface side is incident on the second liquid-crystal panel 60 that is in the on state and is emitted as-is as the first polarization wave. The first polarization wave is reflected by the third reflective polarization plate 53 to the display surface side, is transmitted through the second liquid-crystal panel 60 and the light guide plate 20, and becomes incident on the first liquid-crystal panel 30. Similarly to the case of the first polarization wave emitted from the light guide plate 20 directly to the front surface side, the first polarization wave incident on an off-state pixel in the first liquid-crystal panel 30 is converted to the second polarization wave and transmitted to the front surface side, and the first polarization wave incident on an on-state pixel is emitted as-is as the first polarization wave and absorbed by the second absorptive polarization plate 42. As a result, a viewer present at the front surface side can see a screen in which a luminous state is displayed at positions corresponding to the off-state pixels and black display appears at positions corresponding to the on-state pixels.

<5.2 Advantageous Effects>

According to the present embodiment, similarly to the case of the first embodiment, not only the first polarization wave emitted from the light guide elate 20 to the display surface side but also the first polarization wave emitted to the rear surface side can be transmitted to the front surface side. Therefore, the light utilization efficiency can be improved, and thus the screen can be made brighter. In addition, the first polarization wave emitted from the light guide plate 20 to the rear surface side is reflected to the display surface side, and the quantity of light transmitted to the back surface side of the display 18 can be brought to "0." Thus, a viewer present at the back surface side of the display 18 does not experience stress associated with glare.

In addition, in the present embodiment, disposing the polarization element 26 between the light source 25 and the light guide plate 20 makes it possible to remove the polarization plate disposed between the light guide plate 20 and the first liquid-crystal panel 30 and the polarization plate disposed between the light guide plate 20 and the second liquid-crystal panel 60. Thus, as compared to the displays 15 to 17 according to the foregoing embodiments, the number of components constituting the display 18 can be reduced, and thus the cost of manufacturing the display 18 can be reduced.

<5.3 Modifications>

In the foregoing embodiment, in order to allow only the first polarization wave to be incident on the light guide plate 20 from the light source 25, an LED is used as the light source 25, and the polarization element 26 is provided between the light source 25 and the light guide plate 20. Thus, the second polarization wave is removed upon the light emitted from the LED being transmitted through the polarization element 26, and only the first polarization wave is made incident on the light guide plate 20. Alternatively, a laser can be used as the light source 25. A laser emits a specific polarization wave, which thus renders the polarization element 26 unnecessary. Accordingly, the number of components constituting the display 18 can be reduced.

In addition, in the foregoing embodiment, the light emitted from the light guide plate 20 is the first polarization wave, but the second polarization wave may instead be emitted. In this case, the light transmitted to the front surface side of the display 18 is the first polarization wave.

6. Modifications Common to Each Embodiment

In each of the foregoing embodiments, the light source 25 may be attached to any two or three sides or the four sides of the side surface of the light guide plate 20, aside from being attached to one side of the side surface.

Figure 30:
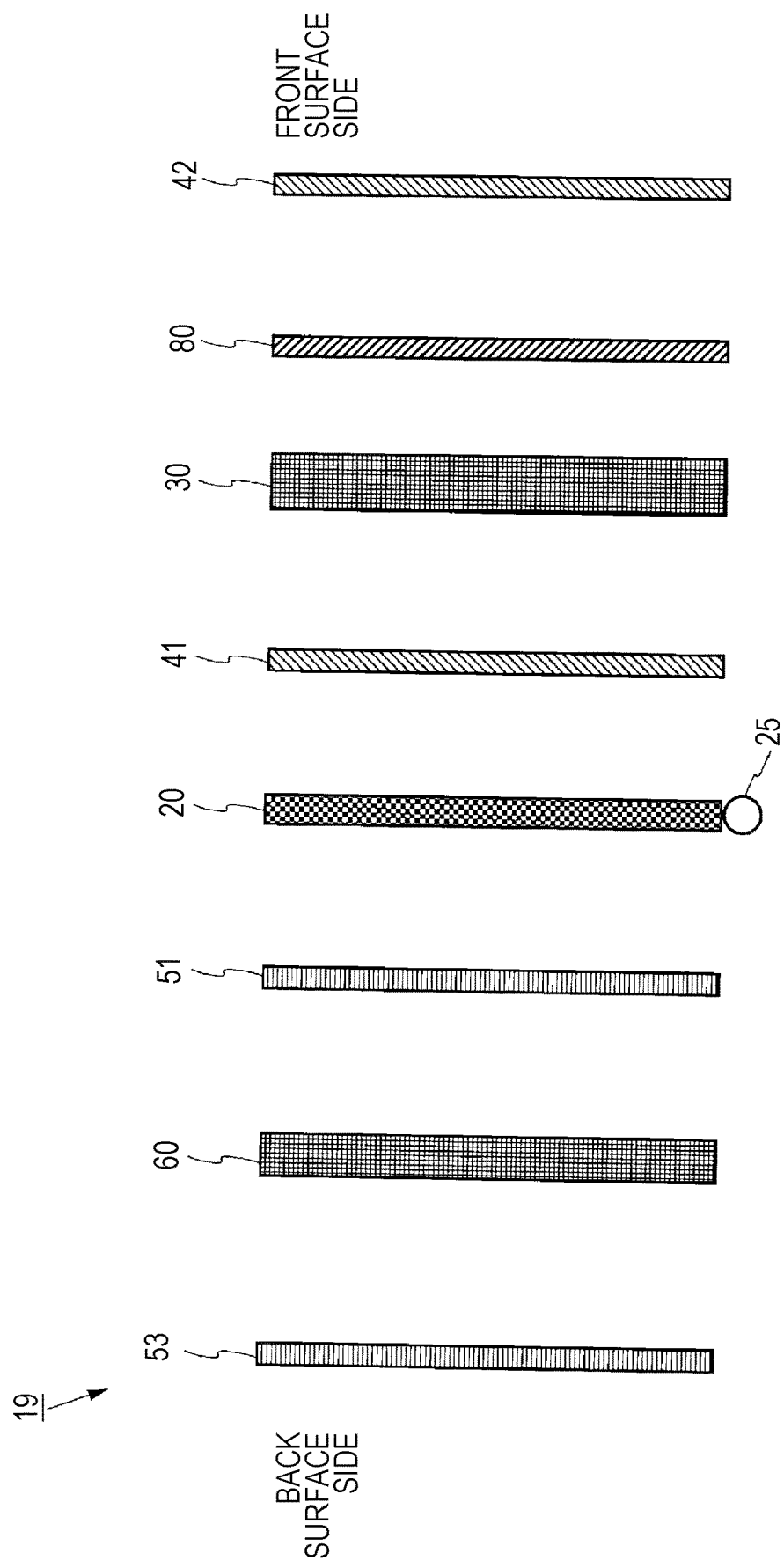
FIG. 30 is a sectional view illustrating a configuration of a display of a color filter type that displays an image and a background in color.

In each of the foregoing embodiments, each of the displays 15 to 18 displays an image and a background in black and white but may instead display an image and a background in color. A color display can be achieved only by slightly modifying the configurations of the displays 15 to 18, and the description is given below with the display 15 according to the first embodiment serving as an example. FIG. 30 is a sectional view illustrating a configuration of a display 19 of a color filter type that displays an image and a background in color. As illustrated in FIG. 30, in the display 19, a color filter 80 is disposed between a first liquid-crystal panel 30 and a second absorptive polarization plate 42. Therefore, the light emitted from the light guide plate 20 or the light incident from the front surface side or the back surface side is transmitted through the color filter 80, and thus an image and a background are displayed in color.

In addition, color display can also be achieved through a field sequential system in place of the color filter system in which the color filter 80 is used, and in the field sequential system, light in three or more colors that can express at least white is emitted in time division. In this case, examples of a combination of LEDs (light-emitting bodies) that constitute the light source 25 include LEDs that emit light in red, green, and blue, and LEDs that emit light in yellow, magenta, and cyan. In this case, these LEDs are preferably disposed in one line on a side surface of the light guide plate 20.

7. Others

In each of the foregoing embodiments, the first liquid-crystal panel 30 and the second liquid-crystal panel 60 driven in a TN system are used as elements for controlling the polarization state of the light transmitted through the displays 15 to 18. However, the first and second liquid-crystal panels 30 and 60 are not limited to a liquid-crystal panel that is driven in a TN system. For example, any element, including an element driven in another system such as a VA system, that is capable of such control of allowing a polarization wave to be transmitted therethrough in one of a driven state and a non-driven state while being sandwiched by two polarization plates and of not allowing the polarization wave to be transmitted therethrough in the other one of the driven state and the non-driven state may be used. Thus, in some cases, the first liquid-crystal panel 30 and an element having the same function as the first liquid-crystal panel 30 are collectively referred to as "a first polarization modulating element," and the second liquid-crystal panel 60 and an element having the same function as the second liquid-crystal panel 60 is collectively referred to as "a second polarization modulating element."

In addition, in order for the displays 15 to 18 to function as a see-through display, the second polarization modulating element may be of either a normally white type or a normally black type. However, when the first polarization modulating element is of a normally white type, a polarization wave transmitted through an off-state pixel is transmitted to the front surface side. In contrast, when the first polarization modulating element is of a normally black type, what is transmitted through an on-state pixel is transmitted to the front surface side. In this manner, the polarization modulating element of a normally black type needs to be driven not only when displaying an image but also when being used as a see-through display. Therefore, the polarization modulating element of a normally white type can be driven with less power consumption as compared to the polarization modulating element of a normally black type.

The present application claims priority to Japanese Patent Application No. 2016-107691, titled "display device," filed on May 30, 2016, and the content of which is incorporated herein by reference.

REFERENCE SIGNS LIST

15-18 DISPLAY
20 LIGHT GUIDE PLATE
25 LIGHT SOURCE

26 POLARIZATION ELEMENT
30 FIRST LIQUID-CRYSTAL PANEL (FIRST POLARIZATION MODULATING ELEMENT)
41 FIRST ABSORPTIVE POLARIZATION PLATE
42 SECOND ABSORPTIVE POLARIZATION PLATE
51 FIRST REFLECTIVE POLARIZATION PLATE
52 SECOND REFLECTIVE POLARIZATION PLATE
53 THIRD REFLECTIVE POLARIZATION PLATE
54 FOURTH REFLECTIVE POLARIZATION PLATE
60 SECOND LIQUID-CRYSTAL PANEL (SECOND POLARIZATION MODULATING ELEMENT)
80 COLOR FILTER

The invention claimed is:

1. A display device: comprising a display that displays an image based on an image signal and that also functions as a see-through display,
wherein the display includes
a light source that emits light including at least one of a first polarization wave and a second polarization wave, the second polarization wave having a polarization axis orthogonal to a polarization axis of the first polarization wave,
a light guide plate that emits the light emitted from the light source toward a display surface side and a rear surface side of the display,
a first polarization modulating element disposed at a display surface side of the light guide plate, the first polarization modulating element having a plurality of pixels formed therein,
an absorptive polarization plate disposed on a surface of the first polarization modulating element at a display surface side,
a second polarization modulating element disposed at a back surface side of the light guide plate, the second polarization modulating element controlling a polarization state of an incident polarization wave in accordance with on/off of the light source, and
a reflective polarization plate disposed on a surface of the second polarization modulating element at a back surface side,
wherein the first polarization modulating element controls a signal voltage corresponding to the image signal applied to each of the pixels to control the polarization state of the polarization wave transmitted through the pixels,
wherein the second polarization modulating element emits the polarization wave upon converting the polarization state thereof while the light source is being turned off and transmits the polarization wave without converting the polarization state thereof while the light source is being turned on, and
wherein the reflective polarization plate transmits the polarization wave having the polarization state thereof converted by the second polarization modulating element while the light source is being turned off and reflects the polarization wave having the polarization state thereof not converted by the second polarization modulating element while the light source is being turned on.

2. The display device according to claim 1, wherein the second polarization modulating element is constituted by a single pixel.

3. The display device according to claim 1, wherein the second polarization modulating element is constituted by a plurality of pixels and emits the polarization wave upon converting the polarization state thereof in each of the pixels or emits the polarization wave without converting the polarization state thereof.

4. The display device according to claim 1, wherein a reflective polarization plate is disposed at least between the light guide plate and the second polarization modulating element.

5. The display device according to claim 4, wherein an absorptive polarization plate is disposed between the first polarization modulating element and the light guide plate.

6. The display device according to claim 5, wherein an absorptive polarization plate is disposed on a rear surface of the display.

7. The display device according to claim 4, wherein a reflective polarization plate is disposed between the first polarization modulating element and the light guide plate, and the light guide plate includes a polarization scattering element.

8. The display device according to claim 1, wherein the polarization wave emitted from the light guide plate toward the display surface side and the rear surface side of the display is either the first polarization wave or the second polarization wave.

9. The display device according to claim 8, wherein a polarization element that transmits one of the first polarization wave and the second polarization wave is disposed between the light source and the light guide plate.

10. The display device according to claim 8, wherein laser light emitted by the light source is either the first polarization wave or the second polarization wave.

11. The display device according to claim 1, wherein the first polarization modulating element and the second polarization modulating element are liquid-crystal panels.

12. The display device according to claim 11, wherein the first polarization modulating element and the second polarization modulating element are normally white liquid-crystal panels.

13. The display device according to claim 11, wherein the liquid-crystal panels are panels of a twisted nematic system.

14. The display device according to claim 1, wherein a color filter is further disposed between the first polarization modulating element and the absorptive polarization plate.

15. The display device according to claim 1, wherein the light source includes a plurality of types of light-emitting bodies that emit light that can express at least white and causes the plurality of light-emitting bodies to emit light successively in time division.

* * * * *